(12) United States Patent
Kikuchi

(10) Patent No.: US 8,805,188 B2
(45) Date of Patent: Aug. 12, 2014

(54) POLARIZATION-MULTIPLEXED OPTICAL TRANSMISSION SYSTEM, POLARIZATION-MULTIPLEXED OPTICAL TRANSMITTER, AND POLARIZATION-MULTIPLEXED OPTICAL RECEIVER

(75) Inventor: Nobuhiko Kikuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 117 days.

(21) Appl. No.: 13/301,893

(22) Filed: Nov. 22, 2011

(65) Prior Publication Data

US 2012/0134676 A1 May 31, 2012

(30) Foreign Application Priority Data

Nov. 29, 2010 (JP) ................................. 2010-265203

(51) Int. Cl.
*H04J 14/06* (2006.01)
(52) U.S. Cl.
USPC .............. 398/65; 398/184; 398/205; 398/152
(58) Field of Classification Search
None
See application file for complete search history.

(56) References Cited

U.S. PATENT DOCUMENTS

| | | | |
|---|---|---|---|
| 2006/0034616 A1* | 2/2006 | Tipper | 398/186 |
| 2008/0170862 A1* | 7/2008 | Vassilieva et al. | 398/152 |
| 2008/0232816 A1* | 9/2008 | Hoshida et al. | 398/152 |
| 2010/0080571 A1* | 4/2010 | Akiyama et al. | 398/184 |

FOREIGN PATENT DOCUMENTS

| | | |
|---|---|---|
| JP | 2008-263590 A | 10/2008 |
| JP | 2010-212886 A | 9/2010 |

OTHER PUBLICATIONS

P.J. Winzer et al., "Spectrally Efficient Long-Haul Optical Networking Using 112-Gb/s Polarization-Multiplexed 16-QAM", Journal of Lightwave Technology, Feb. 15, 2010, pp. 547-556, vol. 28, No. 4, IEEE.
Ling Liu et al., "Initial Tap Setup of Constant Modulus Algorithm for Polarization De-Multiplexing in Optical Coherent Receivers", Fujitsu R&D Center 13/F, Fujistu Laboratories Ltd., 2009, pp. 2-3, IEEE.
Japanese-language Office Action dated Feb. 4, 2014 (Two (2) pages).

* cited by examiner

*Primary Examiner* — Ken Vanderpuye
*Assistant Examiner* — David Lambert
(74) *Attorney, Agent, or Firm* — Crowell & Moring LLP

(57) ABSTRACT

There is a need to prevent two receivers from converging on a state of receiving the same polarization state, fast start receivers, and ensure highly reliable operations. A polarization-multiplexed transmitter previously applies frequency shifts of frequencies $+\Delta f$ and $-\Delta f$ to X-polarization and Y-polarization digital information signals to be transmitted. Optical field modulators modulate and polarization-multiplex the signals. As a result, a frequency difference of $2\Delta f$ is supplied to X-polarization and Y-polarization components. A polarization diversity coherent optical receiver 215 receives the signal. A frequency estimation portion in a digital signal processing circuit detects a frequency difference signal in both polarization components. This signal is used to a polarization splitting circuit in the digital signal processing circuit.

19 Claims, 15 Drawing Sheets

DEFINITION OF
AMPLITUDE AND PHASE

QUARTERNARY PHASE
SHIFT KEYING (QPSK)

16 QUADRATURE AMPLITUDE
MODULATION (16QAM)

POLARIZATION MULTIPLEXING AND
ROTATION OF POLARIZING AXES

CONFIGURATION OF THE DIGITAL SIGNAL PROCESSING
CIRCUIT 114 ACCORDING TO THE RELATED ART

CONFIGURATION OF AN FIR
FILTER (e.g., Hxx)

OPTICAL SIGNAL SPECTRA WITHOUT FREQUENCY SHIFT

OPTICAL SIGNAL SPECTRA WITH OPTICAL FREQUENCY SHIFT

SIGNAL POINTS OF A FREQUENCY-SHIFTED COMPLEX DIGITAL MULTILEVEL SIGNAL 205-1

SIGNAL POINTS OF A FREQUENCY-SHIFTED COMPLEX DIGITAL MULTILEVEL SIGNAL 205-2

INPUT COMPLEX
SIGNAL $V_S$

INPUT COMPLEX
SIGNAL $V_P$

OUTPUT COMPLEX SIGNAL
$U_X$ FROM A BUTTERFLY
FIR FILTER 132

OUTPUT COMPLEX SIGNAL
$U_Y$ FROM A BUTTERFLY
FIR FILTER 132

OUTPUT COMPLEX SIGNAL $V_X$
FROM A FREQUENCY-PHASE
CORRECTION CIRCUIT 220-1

OUTPUT COMPLEX SIGNAL $V_Y$
FROM A FREQUENCY-PHASE
CORRECTION CIRCUIT 220-2

FIG. 10A

EXAMPLE OF IMPLEMENTATION OF ROTATIONAL
MULTILEVEL SIGNAL CODING TABLE 232
ACCORDING TO THIS INVENTION

| clk | VT(232) | | | |
|---|---|---|---|---|
| | d=0 | d=1 | d=2 | d=3 |
| 0 | 1+i | -1+i | -1-i | 1-i |
| 1 | 0.98+1.02i | -1.02+0.98i | -0.98-1.02i | 1.02-0.98i |
| 2 | 0.96+1.03i | -1.03+0.96i | -0.96-1.03i | 1.03-0.96i |
| 3 | 0.95+1.05i | -1.05+0.95i | -0.95-1.05i | 1.05-0.95i |
| 4 | 0.93+1.07i | -1.07+0.93i | -0.93-1.07i | 1.07-0.93i |
| 5 | 0.91+1.08i | -1.08+0.91i | -0.91-1.08i | 1.08-0.91i |
| ... | | | | |

*CLOCK FREQUENCY f IS ASSUMED
TO BE ABOUT 77 MHz

FIG. 10B

EXAMPLE OF IMPLEMENTATION OF PRIOR ART
FIXED MULTILEVEL SIGNAL CODING TABLE 234
ACCORDING TO THE RELATED ART

| FT(234) | | | |
|---|---|---|---|
| d=0 | d=1 | d=2 | d=3 |
| 1+i | -1+i | -1-i | 1-i |

POLARIZATION-MULTIPLEXED OPTICAL TRANSMISSION SYSTEM, POLARIZATION-MULTIPLEXED OPTICAL TRANSMITTER, AND POLARIZATION-MULTIPLEXED OPTICAL RECEIVER

CLAIM OF PRIORITY

The present application claims priority from Japanese patent application JP 2010-265203 filed on Nov. 29, 2010, the content of which is hereby incorporated by reference into this application.

FIELD OF THE INVENTION

The present invention relates to a polarization-multiplexed optical transmission system, a polarization-multiplexed optical transmitter, and a polarization-multiplexed optical receiver. More particularly, the invention relates to an optical transmitter to transmit optical information using optical fiber or, in more detail, to apply polarization multiplexing to an optical signal modulated by an information signal, an optical receiver having a function of receiving and separating the optical signal, and an optical transmission system combining both.

BACKGROUND OF THE INVENTION

Ultra high-speed optical fiber transmission generally uses a wavelength division multiplexing (WDM)transmission technique that transmits multiple optical signals with different wavelengths in a bundle in order to effectively use a wavelength range (or frequency bandwidth) available for the signal transmission, splits the signals in accordance with the original wavelengths at a receiving terminal after transmission through optical fiber, and then allows optical receivers to receive the signals. In addition, a polarization multiplexing technique is also examined for more effective use of a frequency bandwidth.

The polarization multiplexing method uses differences in polarization states of the light. A transmission side modulates two sets of optical signals using an independent information signal. The optical signals are converted into polarization states orthogonal to each other, multiplexed, and then transmitted through optical fiber. The optical signal polarization state can be expressed as a given point on a Poincare sphere. The optical signal polarization state is subject to random transformation in an optical fiber transmission path but maintains orthogonality of the two polarization states. Accordingly, by performing conversion of the polarization state and polarization splitting, a receiving side can split two multiplexed original optical signals. The same wavelength interval can be used to transmit the double quantity of information.

Several methods are known to implement the polarization-multiplexed transmission, specifically, polarization multiplexing on a transmitter and polarization splitting on a receiver.

The following describes a coherent polarization-multiplexed transmission system as one of technologies of the related art for polarization-multiplexed optical receivers. An example of the system is published in: P. J. Winzer, "Spectrally Efficient Long-Haul Optical Networking Using 112-Gb/s polarization-multiplexed 16-QAM", JOURNAL OF LIGHTWAVE TECHNOLOGY, VOL. 28, NO. 4, FEB. 15, 2010, pp. 547-556 (non-patent document 1). FIG. 1 illustrates a digital coherent polarization-multiplexed transmission system of the related art using a polarization-multiplexed optical transmitter and a polarization-diversity coherent optical receiver.

In a polarization-multiplexed optical transmitter 100, a laser source 101 generates an unmodulated laser beam. An optical splitter 108 splits the unmodulated laser beam into two beams and supplies them to two IQ optical field modulators 102-1 and 102-2. The IQ optical field modulator (also referred to as an IQ modulator) includes two sets of MZ modulators that are each parallel placed on a lithium niobate substrate. The IQ optical field modulator applies a fast modulated voltage signal to a modulation signal input terminal of each MZ modulator and is thereby capable of independently modulating in-phase (I) components (or real part) and quadrature-phase (Q) components (or imaginal part) of an optical field. According to this example, an independent multilevel information signal is input to each of input terminals 103-1 and 103-2 corresponding to in-phase modulation signals and input terminals 104-1 and 104-2 corresponding to quadrature-phase modulation signals for the two IQ optical field modulators. As a result, each of the MZ modulators outputs independent multilevel modulation light modulated on a two-dimensional complex plane. The light rays are converted into an X-polarization optical modulation signal 105 and a Y-polarization optical modulation signal 106 so that the polarization states are orthogonal to each other. The signals are input to a polarization multiplexer 107. The polarization multiplexer 107 then outputs a polarization-multiplexed optical transmission signal 120.

FIGS. 2A and 2B illustrate a method of displaying the multilevel signals, signal points according to optical multilevel modulation, and polarization-multiplexed transmission.

FIG. 2A illustrates a signal point on the complex plane (IQ plane). Modulation states of multilevel signals can be represented using optical fields at the center timing (decision time) for waveform of modulated signal. A signal point can be represented using complex Cartesian coordinates (IQ coordinates) or polar coordinates that use amplitude r (n) and phase $\phi(n)$.

FIG. 2B shows a quarternary phase shift keying (QPSK) signal that transmits 2-bit information (00, 01, 11, and 10) per symbol using four values ($\pi/4$, $3\pi/4$, $-3\pi/4$, and $-\pi/4$) as phase angle $\phi(n)$. The signal can be generated as follows, for example. A two-value electric signal is input to each of two input terminals for the IQ optical field modulator 102-1, that is, the input terminal 103-1 for in-phase modulation signals and the input terminal 104-1 for quadrature-phase modulation signals. An in-phase component (I) and a quadrature-phase component (Q) are modulated to a positive two-value signal and a negative two-value signal, respectively. Polarization-multiplexed 100-gigabit transmission uses the quarternary phase shift keying modulation for polarized optical signals. The modulation uses an electric two-value signal approximately at 28 Gbps. The signal is used to generate a quarternary phase shift keying signal capable of transmitting 2-bit information per symbol. The transmission rate is 56 Gbps.

FIG. 2C shows 16 quadrature amplitude modulation (16QAM) capable of higher information transmission efficiency. According to 16QAM, signal points are arranged in a grid. One symbol can transmit four bits of information. In the example of FIG. 2C, Q-axis coordinates represent values for two high-order bits (10xx, 11xx, 01xx, and 00xx). I-axis coordinates represent values for two low-order bits (xx10, xx11, xx01, and xx00). Such a multilevel signal can be generated by supplying a multilevel electric signal (four values in this example) to each of the input terminal 103-1 for in-phase modulation signals and the input terminal 104-1 for quadrature-phase modulation signals in FIG. 1 and specifying electric field coordinates (i(t), q(t)) for in-phase components and quadrature-phase components. At this time, the X-polarization optical modulation signal 105 is output and its electric field is expressed as (i(t)+jq(t))exp(jωt). In the expression, ω signifies an optical angle frequency of the laser source 101 and j signifies an imaginary unit. To generate an intricate optical field signal, an ultra high-speed DA converter may be used to generate voltage signals corresponding to the real part i(t) and the imaginal part q(t) of a complex electric field signal. The voltage signals may be then applied to the input terminal 103-1 for in-phase modulation signals and the input terminal 104-1 for quadrature-phase modulation signals.

FIG. 2D is a conceptual diagram of polarization multiplexing. The light wave is a type of electromagnetic waves. There are two independent orthogonal polarization states (e.g., horizontal polarization and vertical polarization) depending on an oscillation direction of the electric field in relation to the traveling direction. Different information signals can be used to modulate, multiplex, and transmit two optical field components (X-polarization component and Y-polarization component in FIG. 2D). The above-mentioned 100-gigabit transmission multiplexes the X-polarization and the Y-polarization each with an independent quarternary phase shift keying signal at 56 Gbps. The total transmission rate is 112 Gbps. The transmission rate exceeds 100 Gbps due to encoding or addition of error correction information. The transmission rate might vary with transmission systems.

As described with reference to FIG. 1, the polarization-multiplexed optical transmission signal 120 is transmitted over an optical fiber transmission path 121 as long as several tens to thousands of kilometers. At the same time, the signal 120 is subject to transmission degradation due to wavelength dispersion of the optical fiber. A polarization diversity coherent optical receiver 110 of the related art then receives the signal 120. According to the coherent reception technique, light is output from a local oscillator 116 included in the receiver and is used as the reference to detect electric field components in an optical signal. A polarization splitting and optical 90-deg. hybrid circuit 113 splits a polarization-multiplexed received optical signal 122 into eight components, that is, four S-polarization components 123 and four P-polarization components 124. Four balanced optical receivers 111-1, 111-2, 111-3, and 111-4 receive the eight components.

The local oscillator 116 included in the receiver is set to approximately the same optical frequency as the received optical signal 122. The output light is connected to another input port of the polarization splitting and optical 90-deg. hybrid circuit 113 and is split to the balanced optical receivers 111-1, 111-2, 111-3, and 111-4 similarly to the signal light. The input signal light interferes with the local light in each balanced optical receiver and is converted into an electric signal. The output high-speed electric signals are sampled in AD converters 112-1, 112-2, 112-3, and 112-4 and are converted into digital signals. A digital signal processing circuit 114 separates polarization components from the input digital signals and demodulates the signals to output an X-polarization component 125 and a Y-polarization component 126 that are originally contained and are now demodulated. A multi-level signal decision circuit 115 decodes these signals to output an information signal 127. Generally, the receiver (transponder) is followed by a framer and error correction circuit 128. The framer and error correction circuit 128 analyzes a received signal and detects the beginning of a data frame in the signal. The framer and error correction circuit 128 also performs error correction on the received signal using predetermined error correction information supplied before the transmission, reads information from the header, and processes channels and monitor information. The framer and error correction circuit 128 according to the configuration also checks if the polarization splitting process is successful. The framer and error correction circuit 128 issues a reset signal 129 to the digital signal processing circuit 114 so as to re-execute the process if it is determined that the polarization splitting process is unsuccessful.

FIG. 3A is an explanatory diagram of the digital signal processing circuit 114 in the digital coherent polarization-multiplexed transmission system of the related art and illustrates signal processing inside the circuit. The circuit is supplied with four electric digital signals, that is, an S-polarization in-phase component (SI), an S-polarization quadrature-phase component (SQ), a P-polarization in-phase component (PI), and a P-polarization quadrature-phase component (PQ). The signals are each equivalent to a digital signal sequence that is sampled at a rate equal to or twice the symbol rate of the modulation signal and provides the resolution of five to eight bits. A 100G coherent receiver reaches up to 56 giga-samples per second as a sampling rate. Some to several hundreds of input digital signal sequences and internal arithmetic processes are parallel processed in accordance with LSI operation speeds. The following description supposes a complex signal S having real part SI and imaginal part SQ and a complex signal P having real part PI and imaginary part PQ. Wavelength dispersion compensation circuits 130-1 and 130-2 compensate the input signals S and P for an effect of wavelength dispersion over the transmission path. Retiming circuits 131-1 and 131-2 perform timing correction and sampling on the signals so that the waveform central time matches any of odd-numbered or even-numbered sampling times. A butterfly FIR filter 132 is equivalent to a digital equalization filter that adaptively corrects waveforms. The functions include elimination of inter-symbol interference, compensation for residual chromatic dispersion, and polarization splitting as described in this specification. The butterfly FIR filter 132 functions as a two-input and two-output filter that uses two sets of S-polarization and P-polarization complex signals as input and outputs two sets of complex signals having original X-polarization component and Y-polarization component multiplexed in the transmission side. As shown in FIG. 3A, the butterfly FIR filter 132 includes four complex FIR filters, that is, an FIR filter (HXX) 133, an FIR filter (HYY) 134, an FIR filter (HXY) 135, and an FIR filter (HYX) 136. Adder circuits 137-1 and 137-2 synthesize output signals to generate two sets of output signals x and y.

FIG. 3B shows an internal configuration of the complex FIR filter. In FIG. 3B, an input complex signal sequence 144 is equivalent to a complex digital signal having about one or two sampling points per symbol. Inside the FIR filter, a ladder-type digital filter is configured using a delay circuit 146 having the delay time ($Z^-1$) equal to a time interval between sampling points, a complex tap multiplier circuit 147, and a complex adder circuit 148. The filter multiplies a complex tap weight wi by a sample value corresponding to the sample time at every sample time, adds the results to each other, and sequentially calculates and outputs an output complex signal sequence 145. A compensation data setting signal 149 sets the complex tap weights so as to minimize the distortion of the output complex signal sequence 145.

In FIG. 3A, the butterfly FIR filter 132 inputs part of two output signals to CMA arithmetic circuits 140-1 and 140-2 and calculates error signals ($E_{X,CMA}$, $E_{Y,CMA}$). Tap optimization circuits 143-1 and 143-2 perform adaptive equalization and sequentially update tap coefficients for the FIR filters so as to nullify the error signals. The CMA (Constant Modulus Algorithm) is used for signal processing. A CMA circuit calculates an amplitude error (e.g., deviation from a specified value 1.0) in the output signal and outputs the result as an error signal. When receiving a polarization-multiplexed QPSK signal like the 100G signal as described above, it is known that an error signal is nullified if one of the polarization components is completely separated and the waveform distortion is corrected. If the CMA circuit operates normally, the butterfly filter generates an output signal that is compensated for waveform distortion and undergoes polarization splitting.

A frequency and phase correction circuit 141 corrects a frequency difference (frequency offset) between the local oscillator and the transmission light source and corrects an output signal phase shift (shift in the rotation direction on the complex plane). The circuit outputs demodulated signal sequences X and Y. Non-patent document 1 reports that the above-mentioned CMA computation does not function completely because a high-order multilevel signal contains amplitude modulation such as the 16-value modulation inherently causes unstable amplitude. To solve this problem, the following decision-directed method is also used. That is, the CMA computation is used only for initial convergence of tap coefficients for the butterfly FIR filter 132. Decision error calculation circuits 142-1 and 142-2 detect errors between the arranged signal points corresponding to output signals after the tap coefficients are converged to some extent and the multilevel demodulation becomes available. Tap optimization circuits 143-1 and 143-2 are supplied with the detected errors and optimize the taps so as to minimize the errors. The tap optimization circuits 143-1 and 143-2 are provided with reset signal input terminals 139-1 and 139-2 that enable to start reconvergence from the outside as needed.

FIG. 4 is an explanatory diagram showing another polarization-multiplexed transmission system of the related art and illustrates the system that provides the reception side with an automatic optical polarization controller for polarization splitting. A polarization-multiplexed optical transmitter 150 of the related art uses two optical MZ modulators 151-1 and 151-2 for optical signal modulation. A high-speed two-value or multilevel analog electric signal is applied to each of the optical MZ modulators 151-1 and 151-2 for corresponding modulation signals. With respect to the optical MZ modulator 151-2, a low-speed sine wave oscillator 153 outputs a small-amplitude sine wave signal at frequency f. The sine wave signal is applied to a bias signal input terminal 154 in order to optimize a modulated bias voltage. FIG. 4 omits a direct current voltage source for applying a bias and the detailed illustration about the optical MZ modulator 151-1. To optimize the bias voltage, for example, a low-speed optical detector detects an intensity change in the output optical waveform immediately after the optical MZ modulator 151-2. The optical detector adjusts direct current voltage components of the bias signal so as to maximize the components of the frequency f.

Generally, it is known that superposing such small-amplitude modulation degrades the transmission signal quality. A limited modulation bandwidth is used for the bias signal input terminal 154 as a bias modulation terminal. For this reason, the above-mentioned sine wave signal generally uses a low frequency (f=some to several tens of kilohertz) and is set to a modulation degree of 1% to 5%.

Output lights from the two optical MZ modulators 151-1 and 151-2 are converted into polarization states X and Y orthogonal to each other. A polarization multiplexing circuit 107 applies polarization multiplexing to the states and outputs the optical signal. Such a polarization multiplexing circuit uses a polarization beam combiner, a polarization optical splitter, or an optical coupler without polarization dependency. The optical signal is transmitted through the optical fiber transmission path 121. A polarization splitting optical receiver 160 of the related art receives the optical signal. An input portion is provided with an automatic optical polarization controller 158 and a polarization splitting circuit 159 that splits the received signal into two polarization components X and Y.

There are some control methods proposed for the automatic optical polarization controller 158 according to the above-mentioned configuration. The example here assumes the use of low-speed bias modulation components supplied from the transmission side. A low-speed optical detector 155 is provided at a Y-component reception port and branches part of the received light. A bandpass filter extracts components that match the frequency f. A maximization control circuit 157 controls the automatic optical polarization controller 158 so as to maximize the component of the frequency f and thereby provides automatic control so as to always output the Y-polarization component from the transmission side to a Y-component reception port on the reception side. This configuration takes effect when the bias modulation on the transmission side generates an intensity modulation component of the frequency f in the transmitted Y-polarization components. In some cases, it may be necessary to maximize a component of frequency 2f instead depending on optical signal modulation systems (e.g., two-value phase modulation). An optical receiver 162-2 can always maintain an optimal reception state capable of maximizing the Y-polarization component even if the polarization control changes a polarization major axis state of the optical fiber transmission path 121.

Another polarization splitting system is proposed. The system measures reception quality inside the receiver instead of detecting bias components as described above. The system outputs the reception quality as a reception quality signal 161 to the outside and controls the automatic optical polarization controller 158 so as to maximize a value of the signal. The reception quality signal is available if its quantity is sufficient to reflect the signal quality with high sensitivity. For example, the reception quality signal is available as eye opening of a received signal, sign-inverted EVM (Error Vector Magnitude) indicative of the signal point dispersion, negative logarithmic value for a bit error rate, or Q value.

SUMMARY OF THE INVENTION

The following describes problems to be solved in the configurations of the related art.

According to an example of the related art, the polarization diversity coherent optical receiver causes the solution uncertainty called the singularity problem in optimization of the butterfly FIR filter 132 used for polarization splitting. The singularity problem concerns a convergence process that extracts two polarization components, an X-polarization component and a Y-polarization component, from two input signals, an S-polarization signal and a P-polarization signal. Due to the singularity problem, a butterfly filter might converge in the course of the convergence process so as to equalize the X-polarization component and the Y-polarization component, that is, extract the X-polarization component or the Y-polarization component from two output ports at the same time. It is difficult to completely prevent the singularity problem because the optical fiber transmission path causes a slight polarization-dependent loss and therefore the polarization orthogonality is slightly lost. As another problem, it is unsure which of the X-polarization component and the Y-polarization component from the transmission side is extracted to the two ports. One polarization component might replace the other with 50% probability.

It is difficult to detect the singularity problem and the polarization replacement during processes of demodulating and decoding data. Generally, these problems are detected and solved in the framer and error correction circuit 128 provided subsequent to the receiver. In terms of an optical transmitter/receiver for metro core networks related to the present invention, data to be transmitted configures a fixed-length frame based on standards such as OTN (optical transport network), STN, and SDH. A special bit pattern is provided at the beginning of data (preamble) and is used for frame detection. A specified beginning pattern or frame header might not be detected if the singularity problem causes the same reception pattern for both polarizations. If such an anomaly occurs, the framer transmits a filter reset signal (equivalent to the reset signal 129 in FIG. 1) that specifies reconvergence of the butterfly filter in the transmitter/receiver in order to reconverge the butterfly filter. The replacement of two polarizations of data may be solved as follows. A circuit for replacing X/Y-polarization data is provided in the framer. The circuit checks whether or not to replace both polarizations depending on a phase of the beginning pattern.

However, the above-mentioned configuration causes the following problems.

Extra time is needed to start the receiver if the singularity problem occurs and reconvergence is required. This is mainly because the framer or an equivalent circuit outside the optical receiver checks the singularity. The singularity check cannot start until the receiver starts and outputs valid data so that a frame structure can be detected.

In terms of a typical coherent 100G receiver, the butterfly filter convergence requires several thousands to several tens of thousands of symbols (35 picoseconds per symbol time). These symbols are parallel processed approximately in units of 100. Generally, it is considered that the process time requires several tens to several hundreds of microseconds. At least several frames (several microseconds per frame length) need to be observed in order to detect the frame beginning. The frames are also parallel processed and therefore several hundreds of microseconds are required. Even the reconvergence does not ensure a method of preventing convergence on the same state one-hundred percent. Multiple retries might be needed. Eventually, it might take several milliseconds to several tens of milliseconds until a link is established.

Special attention should be paid to incorrect convergence on the same polarization state while the transmitter/receiver is operating. The polarization state of the optical fiber transmission path changes continuously. While the receiver is operating, the tap optimization circuits 143-1 and 143-2 in FIG. 3 need to always keep track of a change in the polarization state and continuously maintain the convergence state. However, the signal quality might momentarily degrade due to polarization mode dispersion or a nonlinear effect of the optical fiber. A high-speed polarization rotation might occur. The tap coefficient might be incorrect due to a bug or noise. Under these conditions, the butterfly FIR filter might incorrectly converge during receiver operations. The output polarization might become identical or reverse. In particular, the decision-directed method is used for high-order multilevel signals and is capable of highly precisely optimizing taps. On the other hand, the decision-directed method is vulnerable to disturbance. The CMA needs to be used again to restart from the coarse convergence if a malfunction occurs to make the decision of a multilevel signal difficult.

In such a case, the convergence state needs to be restored as soon as possible. However, the above-mentioned configuration uses an external framer to detect incorrect convergence and further consumes a long time from detection of the incorrect convergence to completion of the reconvergence. Signals might be disconnected for several frames to several hundreds of frames or several tens of microseconds to several tens of milliseconds. In such a case, each transmitter/receiver needs to generate an alarm indicating the signal disconnection, notify a high-order network apparatus of the line failure, and start the network restoration. If the network is provided with an alternative path, for example, it is necessary to disconnect another line with a lower priority or ensure a standby bandwidth. The network operation is greatly burdened and consumes a large amount of resources such as transmission bandwidths. According to the techniques of the related art, it takes a long time to restore from incorrect convergence of the butterfly FIR filter for polarization splitting. This unnecessarily disconnects signals or reserve standby lines for a long time and causes a large amount of network resources to be consumed. Reliability or efficient operation of the entire network degrades.

An example technique for solving the singularity problem is proposed in Ling Liu, "Initial Tap Setup of Constant Modulus Algorithm for Polarization De-multiplexing in Optical Coherent Receivers", Optical Fiber Conference (OFC) 2009, paper OMT2, March, 2009 (non-patent document 2). This technique starts optimizing only one of the outputs (e.g., X) in the butterfly FIR filter 132, that is, only the FIR filters (HXX) 133 and (HYX) 136. After these filters are converged, the technique adjusts the remaining FIR filters (HXY) 135 and (HYY) 134 so that their initial states approximately become orthogonal to the FIR filters (HXX) 133 and (HYX) 136. The technique then starts the convergence. The technique is highly likely to avoid the singularity problem because the initial state can be approximately adjusted to be orthogonal as targeted from the beginning. However, the technique described in non-patent document 2 cannot avoid the singularity problem one-hundred percent theoretically. The convergence operation is performed twice and might cause longer signal disconnection than the related art technique. Similarly to the related art technique, the technique described in non-patent document 2 creates a risk that the butterfly filter will malfunction during operations and will converge on the same polarization state. The problem of replacing two polarizations of data remains unsolved.

The following describes a problem in the polarization-multiplexed optical transmitter using an automatic optical polarization controller of the related art as shown in FIG. 4. According to the example in FIG. 4, the polarization splitting circuit uses one automatic optical polarization controller 158 and the polarization splitting circuit 159 to forcibly separate the orthogonal polarization components and supply them to the two receivers. In principle, the singularity problem as described in the above-mentioned examples can be avoided. This is because the two receivers are not supplied with signals of the same polarization.

However, the configuration might greatly degrade the X-polarization component while providing the best transmission quality of the Y-polarization component whose modulation component is maximized. For example, the polarization orthogonality is lost after the transmission due to a polarization-dependent loss on the transmission path. In such a case, the X-polarization output light contains a mixture of X- and Y-polarization components. The transmission quality greatly degrades. To prevent the signal degradation, a possible technique detects the transmission quality of the X-polarization component, provides another set of the automatic optical polarization controller and the polarization splitting circuit for maximizing the X-polarization component, and maximizes the quality of the X- and Y-polarization components independently of each other. However, this technique cannot check which of the X- and Y-polarization components is contained in a signal received at each of the receivers. The singularity problem still remains unsolved.

To avoid the singularity problem, another possible technique applies bias modulation signals with different frequencies and small amplitude to both polarization components (see Y in FIG. 4) and identifies the received polarization using the bias modulation. However, the bias modulation makes part of the received signal unavailable for information transmission and degrades the transmission performance such as receiving sensitivity. For example, an intensity modulation of about 10% degrades the receiving sensitivity about 1 dB.

It is therefore an object of the invention to solve the singularity problem in optical polarization multiplexing and splitting transmission and to provide a high-speed and highly reliable polarization multiplexing and splitting system or a method for checking incorrect convergence of a received polarization.

It is another object of the invention to provide a new method of identifying polarization components while preventing signal quality degradation.

The above-mentioned problems may be solved as follows. A polarization-multiplexed optical transmitter modulates input light input to the two optical modulators using mutually different two-value or more multilevel one-dimensional or two-dimensional information signals to generate an optical multilevel signal. The polarization-multiplexed optical transmitter allows the polarization beam combiner to multiplex the optical multilevel signal into mutually orthogonal polarizations for transmission. The polarization-multiplexed optical transmitter supplies, a specified frequency difference between center frequencies for both polarization components. The specified frequency difference just needs to be capable of identifying both polarization components and may be sufficiently set to 20% or less of the entire bandwidth (e.g., full width measured at 20 dB down points) dedicated to the optical signal.

As a possible means for supplying the frequency difference, output light from one transmission light source is split into two that are each input to optical modulators. An optical frequency shift function is provided for, before, or after the optical modulator. The function shifts center frequencies of optical modulator input light used for modulation of both polarizations so that the center frequencies differ from each other by a specified amount.

It may be preferable to use output light from two light sources whose oscillation frequencies differ from each other by a specified frequency. Further, it may be preferable to use a laser source that can simultaneously output two or more wavelengths differing from each other by a specified frequency. The output light may be branched in accordance with wavelengths and may be polarization-multiplexed after modulation using an information signal.

The optical modulator may be available as an optical field modulator that outputs any two-dimensional optical field corresponding to a two-dimensional voltage signal applied to multiple modulation electrodes. In such a case, one optical modulator can simultaneously perform the multilevel modulation and the optical frequency shift according to the invention. In this case, the two optical modulators directly generate and output a two-dimensional rotational optical multilevel modulation signal by applying center frequency shifts, differing from each other by the specified frequency, to two-dimensional multilevel modulation signals.

For this purpose, a high-speed DA converter is connected to each modulation electrode of the optical modulator and generates a two-dimensional rotational multilevel modulation voltage signal corresponding to the two-dimensional rotational optical multilevel modulation signal. The two-dimensional rotational multilevel modulation voltage signal can be generated by performing digital signal processing, reading a table, or complex-multiplying or adding a low-frequency complex analog sine wave signal and a complex multilevel modulation signal together.

According to the invention, the reception side performs polarization splitting on signals and also detects the specified difference frequency information that is supplied between polarizations as mentioned above. The reception side identifies or separates the original orthogonal polarization component that is multiplexed based on the detected information. Specifically, the intensity for the specified frequency difference component may be detected from two polarization components and may be smaller than or equal to a predetermined value. A frequency difference between two polarization components may be smaller than or equal to a predetermined value. A difference between the center optical frequency of an optical signal received at one receiver and that of an optical signal received at the other receiver may be smaller than a predetermined value. In any of these cases, resetting operations of an adaptive polarization splitting circuit can avoid convergence on the same polarization state.

A more sophisticated control method extracts the specified frequency difference component detected from the two polarization components or extracts frequency information corresponding to a center frequency difference of optical signals received by two receivers. The adaptive polarization splitting circuit is adaptively adjusted so as to maximize or minimize a difference between the center frequencies, maximize the intensity of the specified frequency difference component, or make one of pieces of the frequency information greater than the other. It is possible to solve the singularity problem and provide faster and more reliable polarization splitting.

For application of the invention, the transmission side has an input terminal for externally specifying the specified frequency difference between two orthogonal polarization components or has a function of specifying the specified frequency difference. The reception side has a function of outward outputting: difference information between center frequencies of signals received at the two receivers; frequency information corresponding to each of center frequencies for the two receivers; or intensity of a component of the specified frequency difference. It is possible to suppress crosstalk in channel identification or between channels and thereby further improve the reliability. The scope of the invention can be expanded.

The invention is particularly effective for the following cases. The polarization-multiplexed optical receiver may be equivalent to a digital coherent polarization-multiplexed optical receiver that receives a signal based on polarization diversity coherent and provides the polarization splitting circuit based on digital signal processing. The polarization splitting circuit may provide a polarization-multiplexed optical transmission system that includes an automatic polarization controller and a polarization-dependent device.

According to one aspect of the present invention, there is provided a polarization-multiplexed optical transmission system including: a polarization-multiplexed optical transmitter that includes two optical modulators and a polarization beam combiner, modulates input light input to the two optical modulators using mutually different multilevel information signals being one of one-dimensional and two-dimensional to generate an optical multilevel signal, and allows the polarization beam combiner to multiplex the optical multilevel signal into mutually orthogonal polarizations for transmission, wherein the polarization-multiplexed optical transmitter supplies a specified frequency difference to a center frequency of an optical multilevel signal for the mutually orthogonal polarizations; and a polarization-multiplexed optical receiver including: an adaptive polarization splitting circuit for adaptively separating two orthogonal polarization components from a polarization-multiplexed signal; and two sets of demodulation parts for demodulating two separated polarization components.

The polarization-multiplexed optical receiver detects a frequency difference component in two received polarization components and identifies or separates a multiplexed original orthogonal polarization component based on a detected frequency component.

According to another aspect of the present invention, there is provided a polarization-multiplexed optical transmitter including two optical modulators and a polarization beam combiner.

The polarization-multiplexed optical transmitter modulates input light input to the two optical modulators using mutually different multilevel information signals being one of one-dimensional and two-dimensional to generate an optical multilevel signal.

The polarization-multiplexed optical transmitter allows the polarization beam combiner to multiplex the optical multilevel signal into mutually orthogonal polarizations for transmission.

The polarization-multiplexed optical transmitter supplies a specified frequency difference to a center frequency of an optical multilevel signal for the mutually orthogonal polarizations.

According to still another aspect of the present invention, there is provided a polarization-multiplexed optical receiver in a polarization-multiplexed optical transmission system that also includes a polarization-multiplexed optical transmitter. The receiver includes: an adaptive polarization splitting circuit for adaptively separating two orthogonal polarization components from a polarization-multiplexed signal; and two sets of demodulation parts for demodulating two separated polarization components.

The polarization-multiplexed optical receiver detects a frequency difference component in two received polarization components and identifies or separates a multiplexed original orthogonal polarization component based on a detected frequency component.

The polarization-multiplexed optical transmitter includes two optical modulators and a polarization beam combiner, modulates input light input to the two optical modulators using mutually different multilevel information signals being one of one-dimensional and two-dimensional to generate an optical multilevel signal, allows the polarization beam combiner to multiplex the optical multilevel signal into mutually orthogonal polarizations for transmission, and supplies a specified frequency difference to a center frequency of an optical multilevel signal for the mutually orthogonal polarizations.

The present invention can solve the singularity problem in optical polarization multiplexing and splitting transmission and to provide a high-speed and highly reliable polarization multiplexing and splitting system or a method for checking incorrect convergence of a received polarization. The invention can also provide a new method of identifying polarization components while preventing signal quality degradation.

BRIEF DESCRIPTION OF THE DRAWINGS

FIG. 3 is a configuration diagram showing a digital signal processing circuit 114 and FIR filters in the digital coherent polarization-multiplexed transmission system of the related art, in which

FIG. 6 is an explanatory diagram showing optical signal spectra and signal points according to the first embodiment of the invention, in which

FIG. 8 is an explanatory diagram showing operations of the digital signal processing circuit 214 according to the first embodiment of the invention, in which

FIG. 10 exemplifies a multilevel encoding table according to a second embodiment of the invention, in which FIG. 10A exemplifies a rotational multilevel encoding table 232 according to the invention, and FIG. 10B exemplifies a fixed multilevel encoding table 234 of the related art;

DETAILED DESCRIPTION OF THE PREFERRED EMBODIMENTS

Embodiments of the present invention will be described in further detail with reference to the accompanying drawings.

Figure 5:
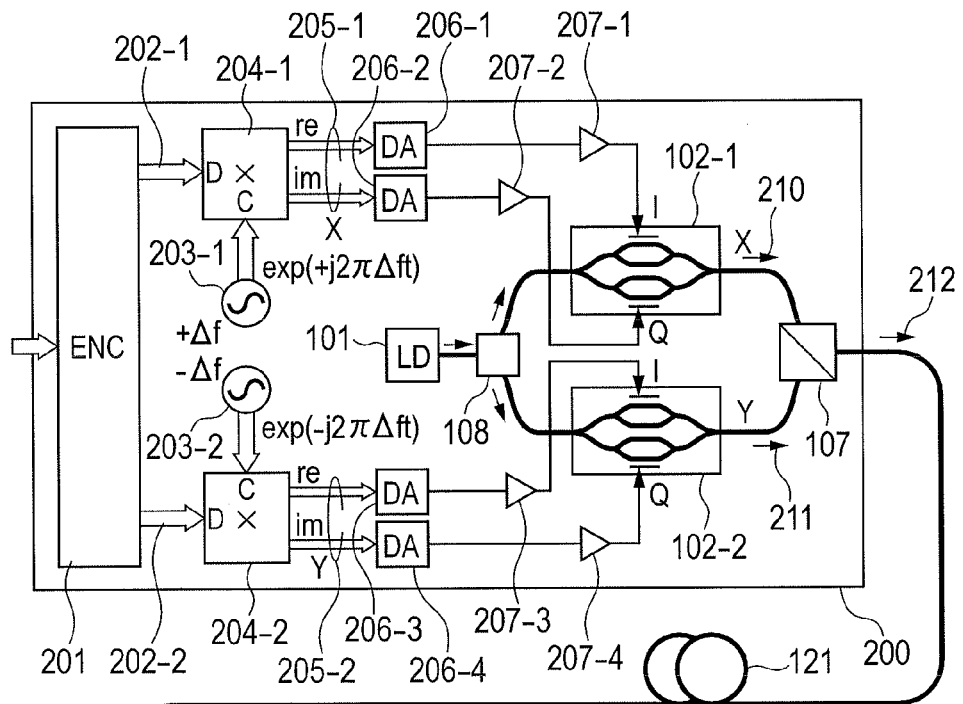
FIG. 5 is a configuration diagram showing a digital coherent polarization-multiplexed transmission system according to a first embodiment of the invention.
Figure 5:
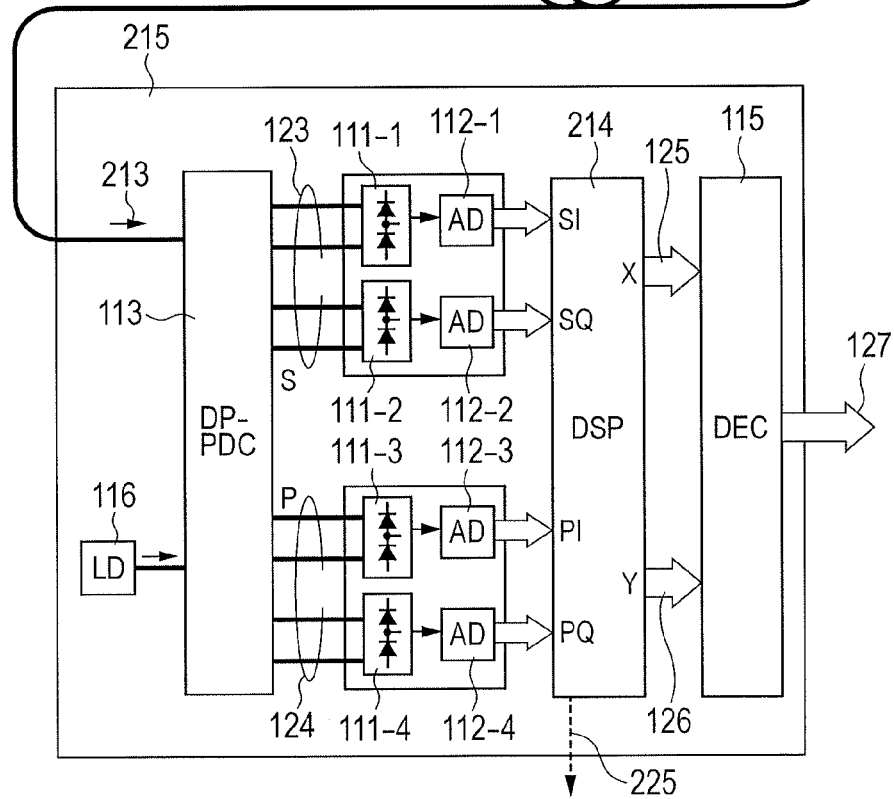

FIG. 5 is a configuration diagram showing a digital coherent polarization-multiplexed transmission system according to the first embodiment of the invention. As shown in FIG. 5, a polarization-multiplexed optical transmitter 200 according to the embodiment outputs a polarization-multiplexed optical transmission signal 212 according to the embodiment. The optical transmission signal 212 is transmitted through an optical fiber transmission path 121. A polarization diversity coherent optical receiver 215 according to the embodiment receives the optical transmission signal 212 as a polarization-multiplexed received optical signal 213 according to the embodiment. In the following drawings, an outline arrow represents the path of a digital signal. A thin line represents the path of a high-speed analog electric signal. A thick line represents the path of an optical signal. A broken line represents the path of a low-speed control signal. Throughout the drawings, the same parts or components as those of the related art are depicted by the same reference numerals and a description is omitted as needed.

The polarization-multiplexed optical transmitter 200 according to the embodiment uses the optical splitter 108 to split the modulation light received from a single transmission light source 101 into two light beams. The optical splitter 108 outputs the light beams respectively or by slightly shifting the frequency of the optical signal corresponding to one of the polarization components. To modulate the X-polarization component according to the example, a complex digital multilevel signal 202-1 is acquired from a multilevel encoder 201 and is input to a complex digital multiplier circuit 204-1. A complex digital oscillator 203-1 is equivalent to an oscillation circuit that digitally generates a complex sine wave (exp(+j2πΔft)) whose frequency is supplemented by Δf. An output signal is input to the complex digital multiplier circuit 204-1. The circuit can be easily implemented based on a system that computes the complex sine wave in real time in accordance with the multilevel signal sampling cycle or sequentially reads complex numbers from a predetermined table.

The complex digital multiplier circuit 204-1 multiplies the supplied complex digital multilevel signal 202-1 by the complex sine wave and outputs, as a calculation result, a complex digital multilevel signal 205-1 whose frequency is shifted by Δf to the positive side. DA converters 206-1 and 206-2 respectively convert the real part and the imaginal part of the signal into analog signals. The analog signals are applied to the in-phase/quadrature-phase modulation terminals of the IQ optical field modulator 102-1 and are converted into optical field signals.

The above-mentioned operation of multiplying the complex multilevel signal by exp (+j2πΔft) is equivalent to an operation of superposing a carrier component at frequency +Δf on the baseband multilevel signal and converting the signal into an intermediate frequency bandwidth signal. As a result, an X-polarization optical modulation signal 210 is generated and its frequency is shifted by +Δf to the positive side (toward shorter wavelengths).

The example modulates the Y-polarization component similarly. A complex digital multilevel signal 202-2 is acquired from the multilevel encoder 201 and is input to the complex digital multiplier circuit 204-2. A complex sine wave (exp(−j2πΔft)) at frequency −Δf is acquired from a complex digital oscillator 203-2 and is superposed on the complex digital multilevel signal 202-2 to generate a frequency-shifted complex digital multilevel signal 205-2. Based on this signal, a Y-polarization optical modulation signal 211 is generated and its frequency is shifted by Δf to the negative side (toward longer wavelengths). As a result, there occurs a frequency difference of 2Δf between the X-polarization optical modulation signal 210 and the Y-polarization optical modulation signal 211.

Figure 6A:
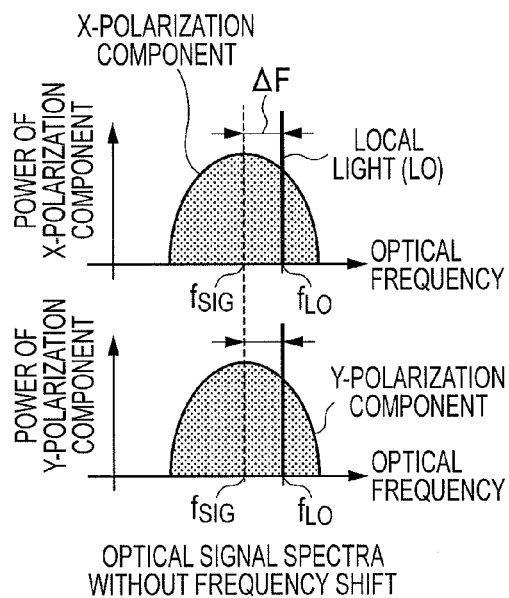
FIG. 6A shows optical signal spectra without optical frequency shift.
Figure 6B:
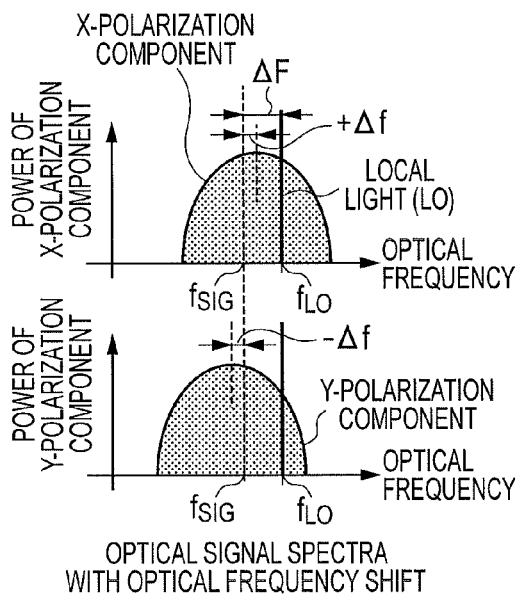
FIG. 6B shows optical signal spectra with optical frequency shift.

FIGS. 6A and 6B are explanatory diagrams showing optical signal spectra. FIG. 6A shows optical signal spectra without the frequency shift. FIG. 6B shows optical signal spectra with the frequency shift. The upper optical signal spectra correspond to the X-polarization component optical signal 210. The lower optical signal spectra correspond to the Y-polarization component optical signal 211. The signal light is modulated with the information signal. The spectrum width increases approximately at the symbol rate of the multilevel signal. In a case of 28G symbols per second, for example, the spectrum width increases about 20 GHz in full width at half maximum or about 38 GHz in full width at 20 dB down. As shown in FIG. 6A, the center frequencies of both polarization components match at fsig. As shown in FIG. 6B, the center frequency of the X-polarization component shifts by +Δf. The center frequency of the Y-polarization component shifts by −Δf.

A thick line in the drawings represents spectral arrangement of the unmodulated local oscillator 116 (optical frequency flo) provided in the receiver 215. A center frequency difference ΔF (offset frequency) between the local light and the signal light is set to be smaller than the signal spectrum width on a digital coherent receiver. The center frequency difference ΔF belongs to the range at a fraction of the symbol rate (e.g., 0 to ±5 GHz in the case of 28G symbols per second). In principle, the embodiment enables specification of any frequency shift amount for the X-polarization and the Y-polarization. In this example, Δf is set to be sufficiently smaller than ΔF so as not to affect a demodulation process of the coherent receiver. Too small a value for Δf degrades a detection speed or accuracy of the receiver as will be described later. It is appropriate to set Δf to about 10 MHz through 1 GHz or 100 MHz, for example.

Too large a value for the specified difference frequency 2Δf also increases a spectrum width dedicated to the polarization-multiplexed optical transmission signal 211. Consequently, the spectrum usage efficiency might decrease. An optical spectrum might be reduced to degrade transmission characteristics due to optical filtering caused by parts such as ROADM and WSS provided for the transmission path. Signals inside the transmitter/receiver deviate from the Nyquist bandwidth for the AD/DA. Aliasing occurs to degrade the signal quality.

For example, a 50 GHz optical bandwidth (channel interval) is allocated to transmission of the 100G signal. This bandwidth contains approximately a 38 GHz bandwidth (20 dB full width) for the 100G signal. If a 10% guard band (=5

GHz) is ensured between channels, up to 7 GHz can be allocated to the difference frequency 2Δf and approximates to 19% (i.e., 7/38) of the optical signal band.

Normally, the sampling frequency of the 100G signal is 56G samples per second, that is, twice the symbol rate (28G symbols per second). The Nyquist frequency is 28 GHz. Let us suppose that frequency difference AF from the local light is allowed to be ±5 GHz during homodyne reception of the above-mentioned 38 GHz optical signal in full width. Then, the received electric signal requires the bandwidth of 38/2+ 5=24 GHz. Therefore, the upper limit of specified difference frequency 2Δf is (28−24)*2=8 GHz. This is 22% of the optical signal bandwidth (i.e., 8/36). For example, the embodiment defines the upper limit of the specified difference frequency supplied between polarizations as 20% of the entire bandwidth (20 dB full width) dedicated to the optical signal. Setting Δf to 100 MHz increases the optical frequency band about 1%. It is possible to almost completely avoid the transmission degradation.

Figure 1:
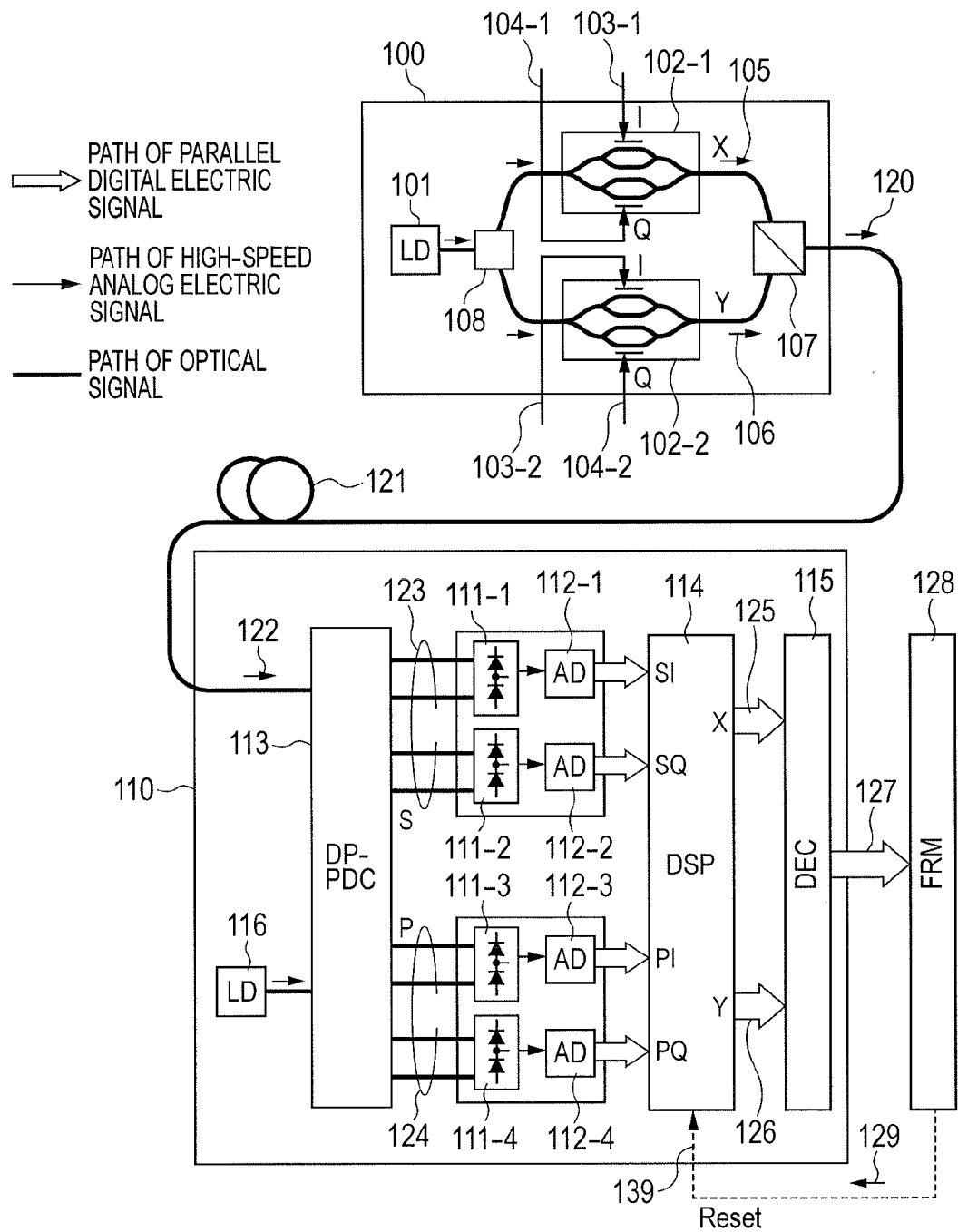
FIG. 1 is an explanatory diagram showing a digital coherent polarization-multiplexed transmission system of the related art.
Figure 2A:
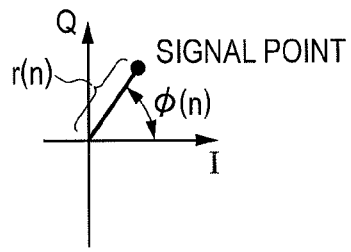
FIG. 2 illustrates a method of displaying the multilevel signals, signal points according to optical multilevel modulation, and polarization-multiplexed transmission, in which FIG. 2A defines amplitude and phase.
FIG. 2B illustrates quarternary phase shift keying (QPSK)
FIG. 2C illustrates 16 quadrature amplitude modulation (16QAM)
FIG. 2D illustrates polarization multiplexing and rotation of polarizing axes.
Figure 2B:
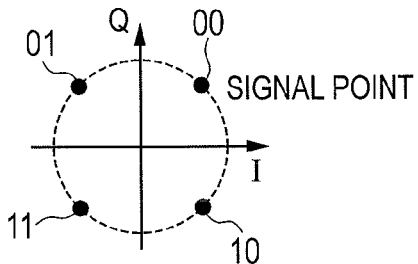
Figure 2C:
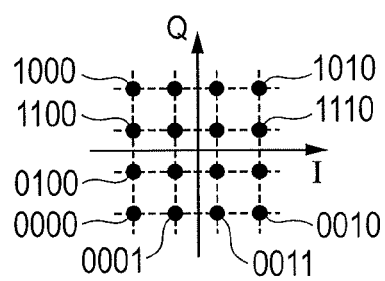
Figure 2D:
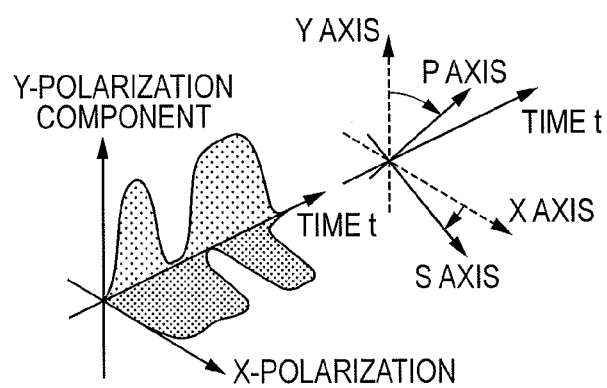
Figure 3A:
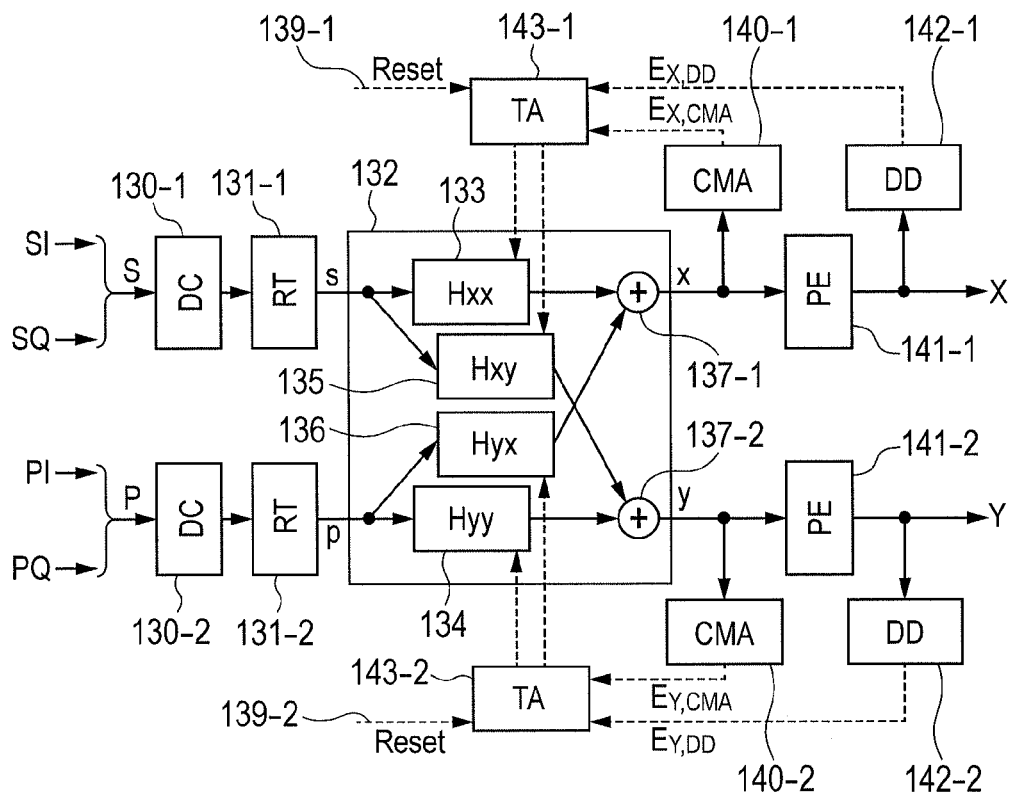
FIG. 3A shows a configuration of the digital signal processing circuit 114 and FIG. 3B shows a configuration of an FIR filter (e.g., Hxx)
Figure 3B:
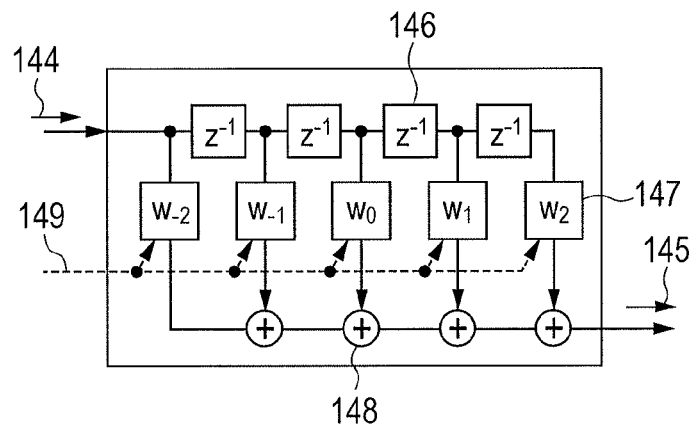
Figure 6C:
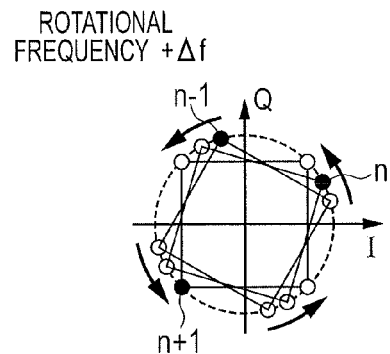
FIG. 6C shows signal points of a frequency-shifted complex digital multilevel signal 205-1.
Figure 6D:
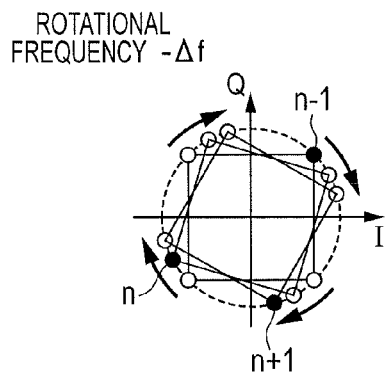
FIG. 6D shows signal points of a frequency-shifted complex digital multilevel signal 205-2.

FIGS. 6C and 6D illustrate signal points of modulation signals according to the embodiment. FIG. 6C shows the complex digital multilevel signal 205-1 that is frequency-shifted by +Δf and is used to modulate the X-polarization component. FIG. 6D shows the complex digital multilevel signal 205-2 that is frequency-shifted by −Δf and is used to modulate the Y-polarization component. Both examples show that the modulation signal is compliant with the 4-value phase modulation. Basically, a band-modulated quarternary phase shift keying signal uses arrangement of temporally fixed signal points as shown in FIG. 2B. However, the frequency shift slightly shifts the center frequency. Both are transformed into a two-dimensional rotational optical multilevel modulation signal whose signal points temporally rotates on a two-dimensional complex plane. This equally applies to the optical field and the complex digital signal represented as its equivalent low frequency.

Let us assume that the digital multilevel signal uses a symbol rate of 28G symbols per second and the shift amount Δf is set to 56 MHz, for example. Then, the rotation amount per symbol equals one 500th of the circumference, that is, 0.72 degrees. If the X-polarization component is assumed to have the frequency shift of +Δf, the signal points rotates 0.72 degrees counterclockwise in the order of symbol times n−1, n, and n+1. Actually, a black dot, one of four white dots, is used for information transmission. If the Y-polarization component is assumed to have the frequency shift of −Δf, the signal points rotates at the same rate clockwise. As described above, the embodiment can be interpreted in the sense that the X-polarization and the Y-polarization transmit information using the signal points rotating slowly at different rates. In the above-mentioned example, the sampling rate of the digital signal is equal to the symbol rate of the multilevel signal. If both differ from each other, the problem can be solved by generating a digital sample sequence that appropriately adjusts the time requirements.

Figure 7:
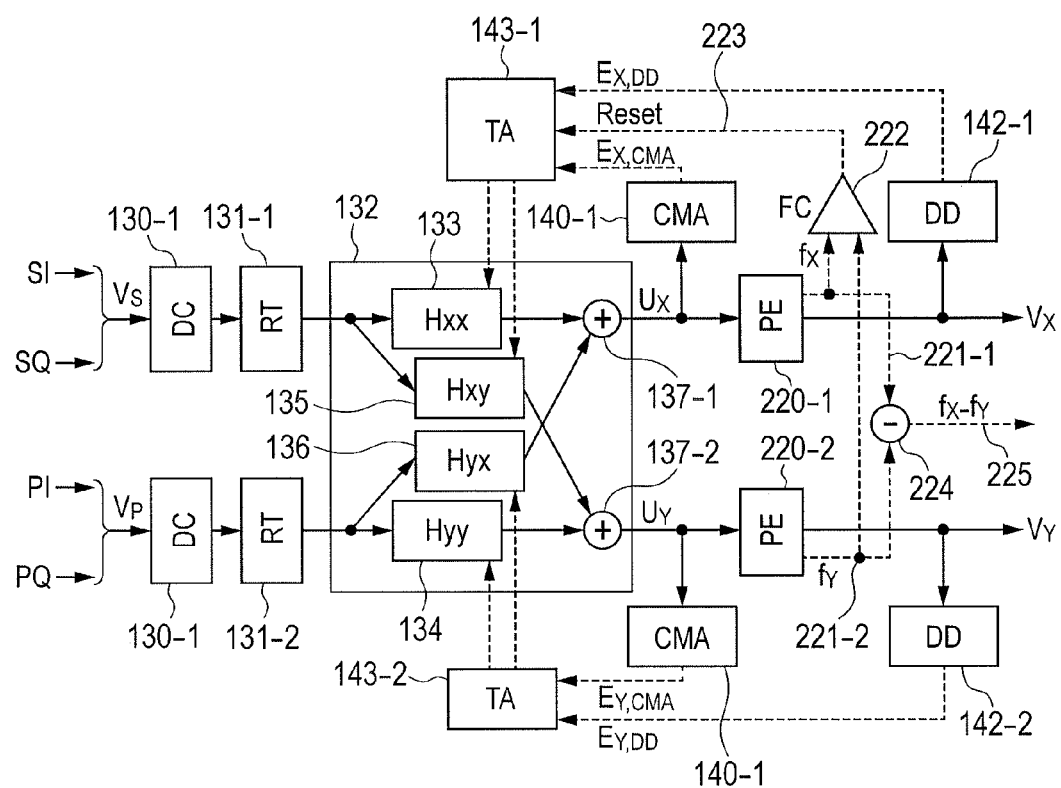
FIG. 7 is a configuration diagram showing a digital signal processing circuit 214 according to the first embodiment of the invention.

The polarization diversity coherent optical receiver 215 according to the embodiment receives the above-mentioned optical signal. A digital signal processing circuit 214 according to the embodiment demodulates the optical signal. FIG. 7 is a configuration diagram showing the digital signal processing circuit 214 according to the embodiment. In this example, frequency and phase correction circuits 220-1 and 220-2 have output terminals corresponding to estimated offset frequencies. The output terminals are each assumed to be X-polarization offset frequency fX and Y-polarization offset frequency fY. The frequencies are output as offset frequency estimation signals 221-1 and 221-2. In this example, both signals are input to a frequency comparator circuit 222. The frequency comparator circuit 222 compares both frequencies and outputs a reset signal 223 if a difference between both is smaller than a predetermined value. The reset signal may be output in the following cases, for example. One case is that the intensity for a frequency difference component is detected from two polarization components and is smaller than or equal to a predetermined value. Another case is that a frequency difference between two polarization components is smaller than or equal to a predetermined value. Still another case is that a difference between the center optical frequency of an optical signal received at one demodulation parts and that of an optical signal received at the other demodulation parts is smaller than a predetermined value.

Figure 8A:
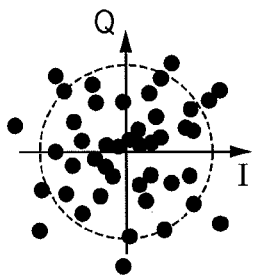
FIG. 8A shows input complex signal VS.
Figure 8B:
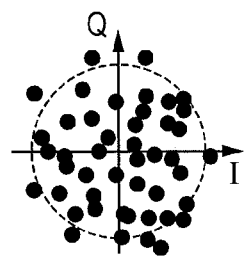
FIG. 8B shows input complex signal VP.
Figure 8C:
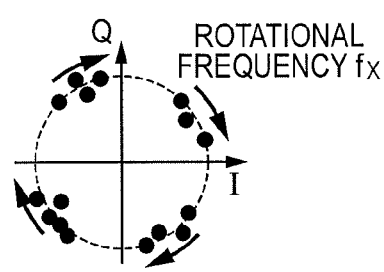
FIG. 8C shows output complex signal UX from a butterfly FIR filter 132.
Figure 8D:
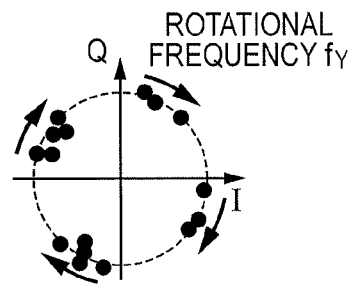
FIG. 8D shows output complex signal UY from the butterfly FIR filter 132.
Figure 8E:
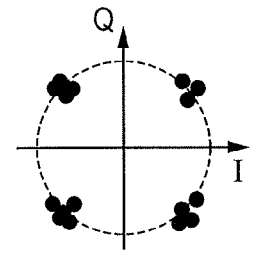
FIG. 8E shows output complex signal VX from a frequency and phase correction circuit 220-1.
Figure 8F:
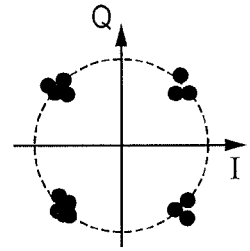
FIG. 8F shows output complex signal VY from a frequency and phase correction circuit 220-2.

FIGS. 8A through 8F are explanatory diagrams illustrating operations of the digital signal processing circuit 214 and show signal point distribution of both polarization components at different positions. FIGS. 8A and 8B show input signals Vs and Vp, respectively. Complex optical fields of the optical field signal distribute almost randomly because polarization splitting is not performed or waveform distortion is not removed. FIGS. 8C and 8D show complex signals UX and UY output from the butterfly FIR filter 132. As shown in FIGS. 8C and 8D, temporally rotating signal points are available if the wavelength dispersion compensation circuit 130 and the butterfly FIR filter 132 normally correct waveforms and perform the polarization splitting operation. Rotational frequencies fx and fy in both signal points each denote the difference (see FIG. 6) between the center frequency for each polarization component and the oscillation frequency of the local light. The example approximately assumes fx=ΔF+Δf and fy=ΔF−Δf. These signals are input to the frequency and phase correction circuits 220-1 and 220-2. Relatively slow rotation components (rotational frequencies fx and fy) are estimated in the signal points and are removed. FIGS. 8E and 8F show complex signals VX and VY output from the frequency and phase correction circuits 220-1 and 220-2. These signals are used for a subsequent multilevel check. The frequency and phase correction circuits 220-1 and 220-2 output the estimated rotational frequencies fx and fy as the offset frequency estimation signals 221-1 and 221-2 in the form of numeric information. The embodiment discriminates between two received polarization components based on a difference or magnitude relation between the signals.

The tap optimization circuits 143-1 and 143-2 in FIG. 7 operate as follows. When a reception operation starts, a convergence operation starts so as to minimize error signals $E_{X,CMA}$ and $E_{Y,CMA}$ generated from the CMA arithmetic circuits 140-1 and 140-2. After the operation is performed for a specified number of times, the reset signal 223 might be output, that is, a frequency difference between both polarization components might be zero, for example. In such a case, the tap optimization circuits 143-1 and 143-2 both extract the same polarization component. The tap optimization circuit 143-1 (or both circuits 143-1 and 143-2) is reset to start the reconvergence. It is preferable to appropriately change each FIR filter to a new initial polarization state and then start the reconvergence. The convergence operation may continue as is if no reset signal is output.

The technique can check for correctness of the polarization splitting by using signals output from the frequency and phase correction circuits 220-1 and 220 -2 located immediately after the butterfly FIR filter 132. An estimated frequency is available before the filter converges completely. The technique according to the embodiment can therefore start the reconvergence much faster than the related art. It may be also preferable to consider the sign for a frequency difference between the polarization components. For example, the transmission side may configure the modulation frequency for the X-polarization component so as to be larger than the Y-polarization component. The reception side assumes a direction of positive frequencies to be normal convergence. It is possible to prevent the receiver from replacing the polarization components. For example, it may be preferable to extract frequency difference components detected from the two polarization components or pieces of frequency information corresponding to the center frequencies of the optical signals demodulated from two sets of demodulation parts. Then, the digital signal processing circuit 214 (adaptive polarization splitting circuit) may be adaptively adjusted so that a difference between the center frequencies is maximized or minimized, the intensity for the frequency difference components is maximized, or one of the pieces of frequency information corresponding to the center frequencies becomes greater than the other.

Figure 4:
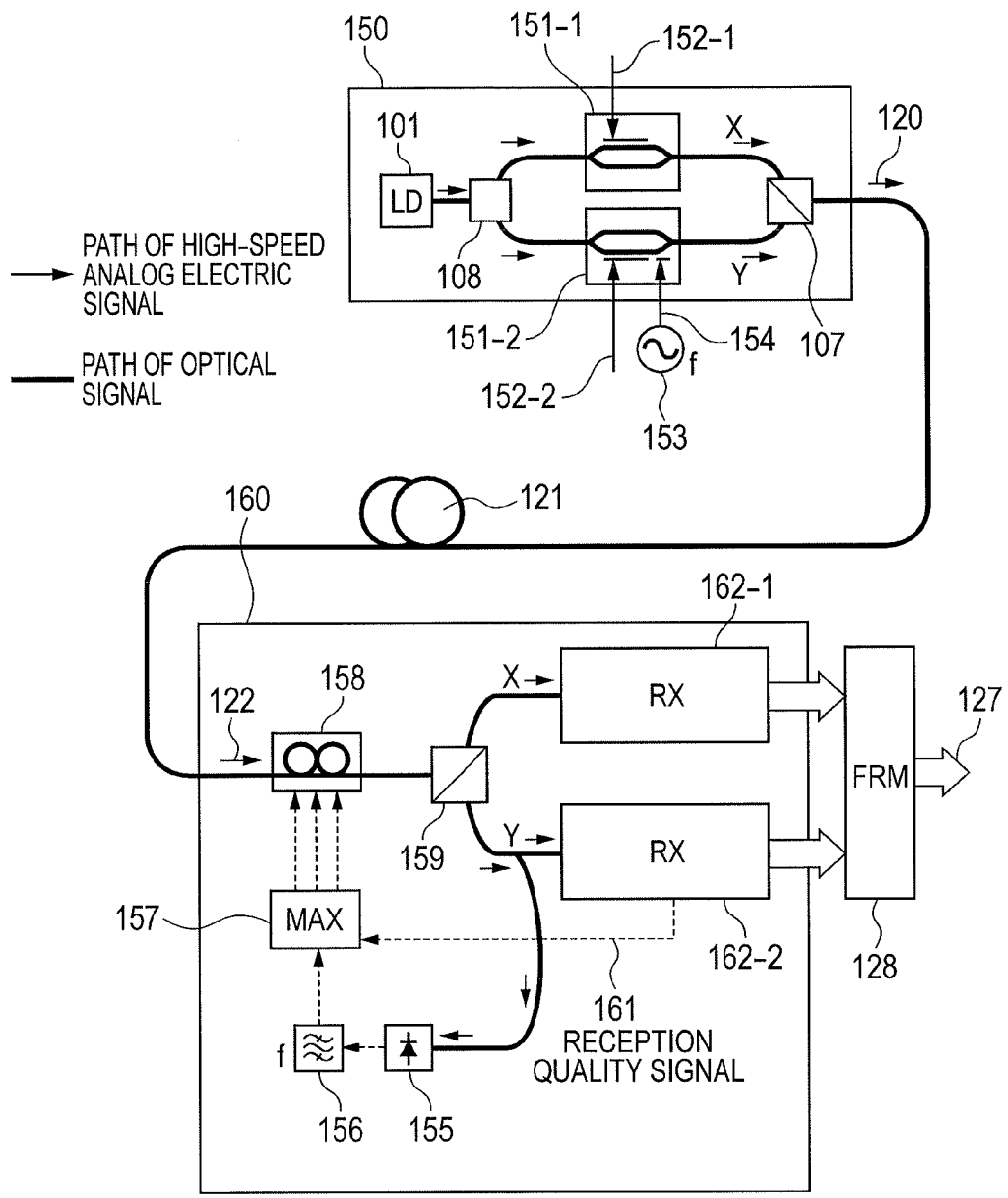
FIG. 4 is an explanatory diagram showing a polarization-multiplexed transmission system using an automatic optical polarization controller of the related art.

In FIG. 7, an inter-polarization difference frequency calculation circuit 224 is provided to calculate a difference between the offset frequency estimation signals 221-1 and 221-2 acquired from the frequency and phase correction circuits 220-1 and 220-2 and output the difference from an inter-polarization difference frequency output terminal 225. This terminal is equal to the inter-polarization difference frequency output terminal 225 of the digital signal processing circuit 214 in FIG. 5. The output terminal 225 outputs the following to the outside: difference information between the center frequencies of signals received at two sets of demodulation parts; frequency information corresponding to the center frequencies of signals received at two sets of demodulation parts; or the intensity for the component of a specified frequency difference, for example. This signal reflects the situation of a polarization splitting operation of the butterfly FIR filter in the digital signal processing circuit 214 or an inter-polarization frequency difference supplied from the transmission side. The frequency difference, if set to a specified value (e.g., 200 MHz, twice as much as $\Delta f=100$ MHz in the example of FIG. 4), indicates that the polarization splitting normally operates. The signal can be used as a supervisory signal that indicates the normal or abnormal polarization splitting state of the receiver. For this purpose, a high-order monitoring device may be provided outside the embodiment to collect the signal and generate an alarm or manage a log. On the transmission side, slightly different frequencies (e.g., from 50 MHz to 100 MHz in increments of 0.1 MHz) may be allocated to transmitters having different wavelengths. A frequency difference may be provided between polarizations. This information may be used for wavelength channel identification on the reception side. Different frequencies maybe allocated to adjacent channels to eliminate inter-polarization frequency difference information from an adjacent channel and provide highly reliable polarization control. The coherent receiver tunes the local oscillator wavelength to select a reception channel. This feature also makes it possible to easily confirm that the receiver has received an optical signal having the correct wavelength.

The first embodiment shows the example of using the IQ optical field modulator 102 for optical signal modulation. Such an IQ optical field modulator is available as an optical IQ modulator (also referred to as a dual parallel modulator or an optical SSB modulator) similar to a Mach-Zehnder interferometer reconfigured from two Mach-Zehnder optical modulators. The optical IQ modulator has a function of directly converting voltage signals applied to two IQ terminals into an IQ signal for output optical fields and is therefore suited for the embodiment. Well-known examples of the IQ modulator include a modulator using lithium niobate crystal, a modulator using semiconductor, and an integrated device in combination with other waveguides. Any configuration may be used if the equivalent function is provided. On these modulators, it is known that the linearity of electric field modulation is lost as an applied voltage approaches half-wavelength voltage V$\pi$. To solve this problem, additional methods maybe also used. One is to decrease an applied voltage so that the range of applied voltages is sufficiently included in the linear region. Another is to use an applied voltage table having reverse characteristics so as to compensate for nonlinearity. Still another is to use an external correction circuit for linearization.

As will be described later, the same effect is available for not only the optical IQ modulator but also multiple modulators such as a tandem configuration of amplitude modulators and phase modulators. In this case, appropriate coordinate transformation (transformation into polar coordinates in this example) needs to be previously applied to voltage signals supplied to the modulators.

Throughout the embodiment, the optical multilevel modulation is described with reference to the two-dimensional multilevel signal representable on a complex plane, in particular, the quarternary phase shift keying signal as an example. However, the scope of the embodiment is not limited thereto. The embodiment is widely applicable to two-value modulation and the other various high-order and multilevel modulations if a modulation signal is capable of optical polarization multiplexing. For example, the embodiment is also applicable to widely used two-value intensity modulation signals, two-value phase modulation signals, high-order quadrature amplitude modulation signals such as 8QAM, 16QAM, and 64QAM, and high-order amplitude and phase modulation signals such as 8APSK and 16APSK. Application of the embodiment does not cause an essential effect even if mutually different multilevel signals modulate an optical signal used for modulation of the X/Y-polarization or a multilevel modulation signal is temporally variable.

The optical frequency shift according to the embodiment may be applied to either or both the X-polarization and the Y-polarization to be synthesized. The modulation frequency itself may be varied temporally. Nonetheless, the reception side can easily discriminate between polarization components by predetermining which of the X-polarization and the Y-polarization is larger than the other.

The embodiment has described the configuration that applies the frequency shift to both polarization components. In addition, the configuration may modulate only one of the polarization components. In this case, the signal processing and the modulation circuit configuration can be simplified. If the frequency shift is applied to both polarization components, on the other hand, the same route is used for X-polarization and Y-polarization modulation signals. Configurational advantage is available such as easy adjustment of relative delay (skew) in modulated electric signals according to both polarizations. The reception side uses a difference frequency ($2\Delta f$ in the embodiment) between both polarizations to discriminate between polarization components. Therefore, a frequency modulation amount may be freely distributed between the X-polarization and the Y-polarization. The embodiment modulates both the X-polarization and the Y-polarization to reverse signs and can minimize the frequency shift applied from DA converters. The embodiment can minimize degradation due to aliasing (deviation of a frequency-shifted modulation signal from the Nyquist bandwidth) occurring in the DA converters.

Figure 9:
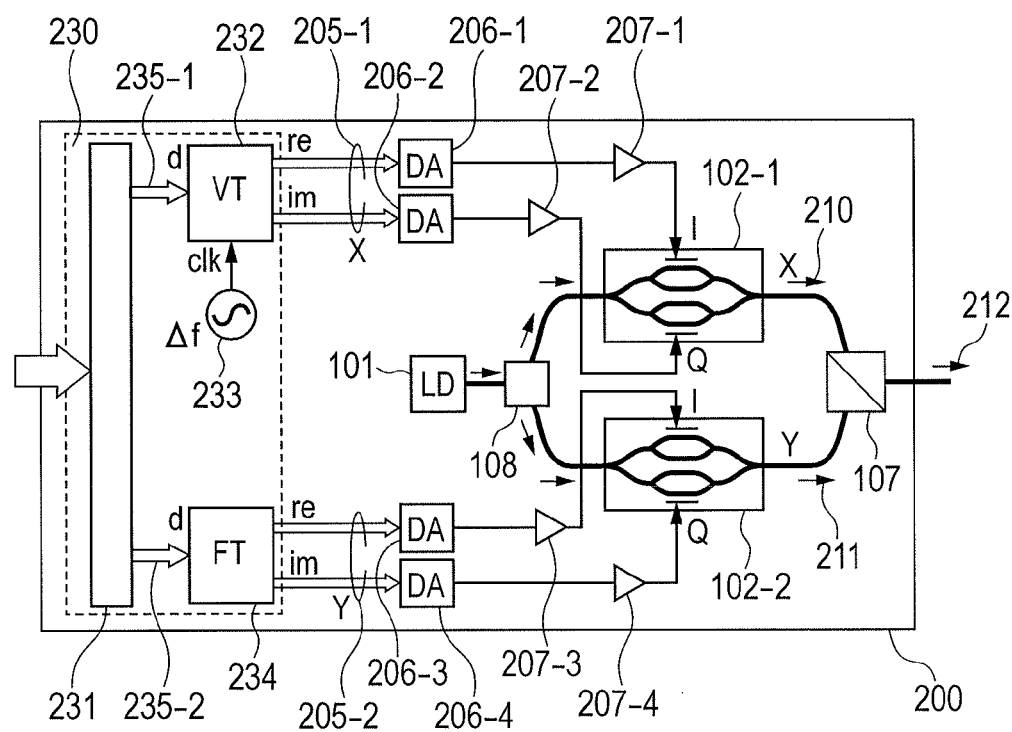
FIG. 9 is a configuration diagram showing a polarization-multiplexed optical transmitter according to a second embodiment of the invention.

FIG. 9 is a configuration diagram showing a polarization-multiplexed optical transmitter according to a second embodiment of the invention. The example shows another method of generating a frequency shift signal. As described with reference to FIGS. 6C and 6D, the embodiment may modulate X-polarization and Y-polarization components using the signal points that slowly rotate at mutually different rates. The example in FIG. 9 directly generates an X-polarization modulation signal using a rotational multilevel encoding table 232 without using multiplication.

In a multilevel encoding circuit 230 according to the embodiment, an encoding logic circuit 231 outputs an intermediate sign 235-1 for the X-polarization component corresponding to an input information signal. The intermediate sign is used for the description and need not be used for the implementation. The following description assumes 4-value modulation using four values where d is set to 0 through 3. A clock circuit 233 outputs an index number (clk=0 through N−1) for a cycle at frequency Δf corresponding to each timing for digital data sampling. The rotational multilevel encoding table 232 according to the embodiment reads an internal table based on the intermediate code d and the index number clk and outputs the table as the frequency-shifted complex digital multilevel signal 205-1.

FIG. 10A shows a configuration example of the rotational multilevel encoding table 232. To generate the table, the example reads a coordinate corresponding to the intersection of the intermediate code d (column) and the index number clk (row). Each row of the table previously stores the signal points that rotates at frequency Δf in accordance with a lapse of time as shown in FIG. 6C, that is, an increase in the index numbers. The maximum index number determines the number of rows in the table. The table contains about 1000 rows if the frequency Δf is one thousandth of the symbol rate as described above. Each row indicates no more than two numeric values only marked with changes in the combination of signs, and in-phase and quadrature-phase components. For example, the row corresponding to clk=4 only indicates 0.93 and 1.07. A logic circuit may configure all or part of the encoding table. A sufficiently small circuit scale may be available if the above-mentioned regularity is used. The example assumes the symbol rate and the sampling rate to be equal to each other for simplicity similarly to the above-mentioned example. If a higher data sampling rate is needed, an interpolation circuit maybe provided subsequently to a table output portion so that sample points are interpolated to output the table.

FIG. 10B exemplifies a fixed multilevel encoding table 234 of the related art. The second embodiment of the invention shown in FIG. 9 assumes that no frequency shift is applied to the Y-polarization component. The fixed, temporally unchanging multilevel encoding table (or a logic circuit) as shown in FIG. 10B is suited for such a case. It should be noted that the frequency shift may be applied to the Y-polarization component.

Figure 11:
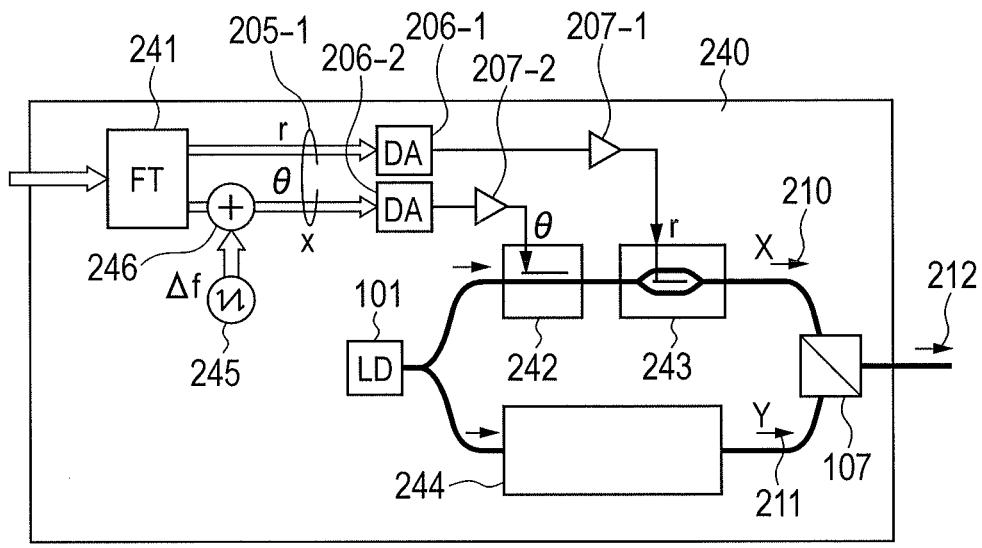
FIG. 11 is a configuration diagram showing a polar-modulation polarization-multiplexed optical transmitter according to a third embodiment of the invention.
Figure 12:
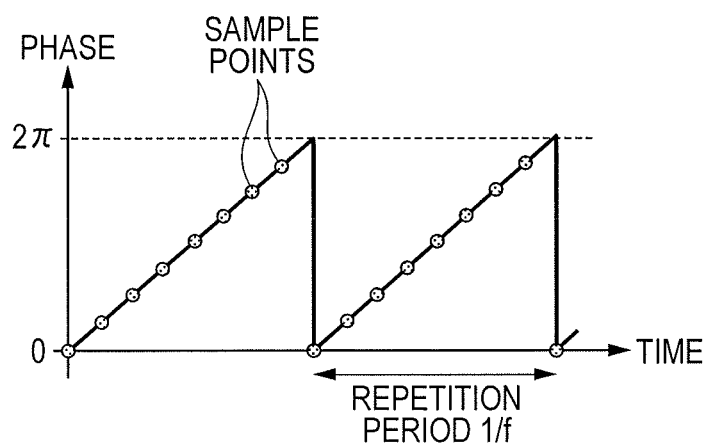
FIG. 12 is an explanatory diagram showing a saw-tooth wave generation circuit 245 according to the third embodiment of the invention.

FIG. 11 is a configuration diagram showing a polar-modulation polarization-multiplexed optical transmitter according to a third embodiment of the invention. The example combines an optical phase modulator 242 with an optical amplitude modulator 243, specifies the phase and the amplitude of an optical signal, and generates a targeted multilevel optical field. The example shows only the X-polarization modulation configuration. A Y-polarization modulation circuit 244 may comply with the configuration of the related art or any of the modulation systems according to the invention. A polar-coordinate multilevel encoding table 241 generates and outputs a multilevel code represented in polar coordinates corresponding to the input information signal. A digital saw-tooth wave generation circuit 245 generates a repetitive digital saw-tooth wave (staircase wave) whose phase gradually increases or decreases at the frequency Δf. The circuit may be replaced with a table. FIG. 12 exemplifies the digital saw-tooth wave generated from the circuit. The wave ranges from 0 to 2π and rotates the phase 2π in a cycle of the reciprocal of the frequency Δf. A phase adder circuit 246 adds a phase change in the saw-tooth waveform to a phase component output from the polar-coordinate multilevel encoding table 241 and generates a complex digital multilevel information signal 205-1. As a result of the phase addition, the signal points of output signals rotates at the constant rate of frequency Δf as shown in FIG. 6C and provides the targeted frequency shift effect. A similar effect may be provided without using the phase addition, instead, by using the rotational multilevel encoding table in advance as described in the second embodiment.

Though not described in this example, a two-electrode Mach-Zehnder (MZ) optical modulator is available as one of well-known polar-coordinate optical modulators. The two-electrode MZ modulator includes two modulation electrodes (Va and Vb as applied voltages). As is well known, the two-electrode MZ modulator has polar coordinate modulation characteristics in which the amplitude of an optical output electric field is proportional to a difference voltage (Va−Vb) applied to the two electrodes and the phase rotation amount is proportional to (Va+Vb). Accordingly, the MZ modulator maybe used as a polar-coordinate modulator. A modulation voltage may be sequentially applied so that a total voltage at both modulation electrodes generates the saw-tooth wave as shown in FIG. 12. Even in these situations, it is possible to generate a multilevel signal rotating at the frequency Δf as described above. The embodiment is also applicable to optical field modulators having the other modulation structures by generating a temporally rotating multilevel signal similar to the above.

Figure 13:
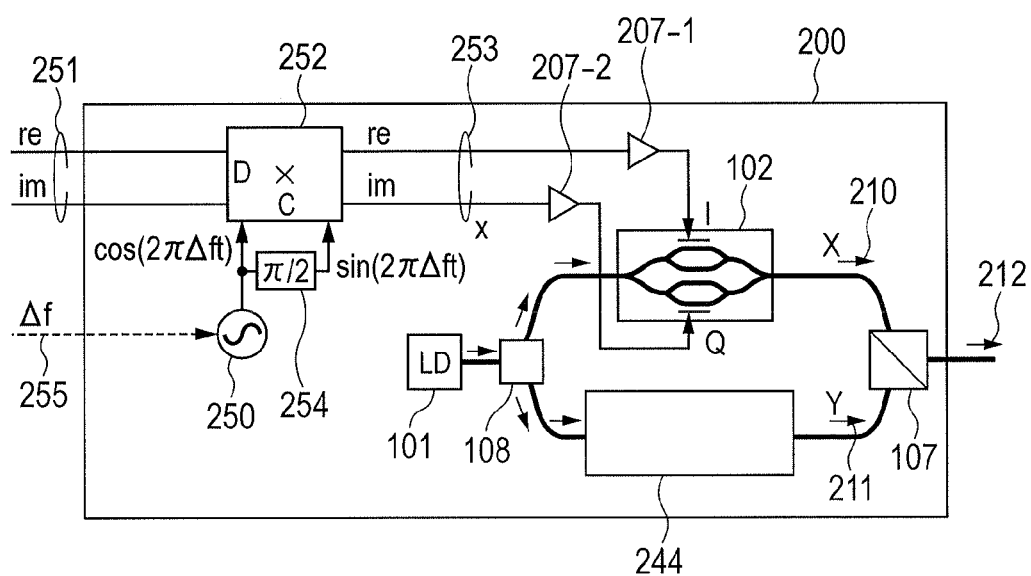
FIG. 13 is an explanatory diagram showing a polarization-multiplexed optical transmitter 200 according to a fourth embodiment of the invention.

FIG. 13 is an explanatory diagram showing a polarization-multiplexed optical transmitter 200 according to a fourth embodiment of the invention. The example uses analog operations to generate the above-mentioned rotating multilevel signal points without using a digital operation or a high-speed DA converter. The configuration directly replaces the components in FIG. 5 with analog operations. A complex analog multiplier 252 complex-multiplies a complex analog multilevel signal 251 input to the transmitter by a sine wave for the frequency Δf supplied from a frequency-agile sine wave oscillator (low-frequency analog oscillator) 250. As a result, the frequency shift is generated. Specifically, the frequency-agile sine wave oscillator 250 outputs a signal that is used as a cosine wave cos (2πΔft). A 90-degree phase shifter 254 converts the output signal into a sine wave sin (2πΔft). The cosine wave and the sine wave respectively correspond to the real part and the imaginal part of a complex sine wave signal that is synthesized as exp(j2πΔft)=cos(2πΔft)+j sin (2πΔft). The complex sine wave signal is supplied to one of inputs to the complex analog multiplier and is multiplied by the complex analog multilevel signal 251. In this manner, the targeted frequency shift effect is provided. The complex analog multilevel signal 251 can be used for various multilevel modulations. For example, a quarternary phase shift keying signal may use the complex analog multilevel signal 251 so that its real part and imaginal part correspond to analog two-value electric signals. A high-speed DA converter may generate the complex analog multilevel signal 251 itself if an intricate multilevel modulation signal is used. Instead of the complex analog multiplier, a complex analog adder may be provided for complex addition.

Figure 14:
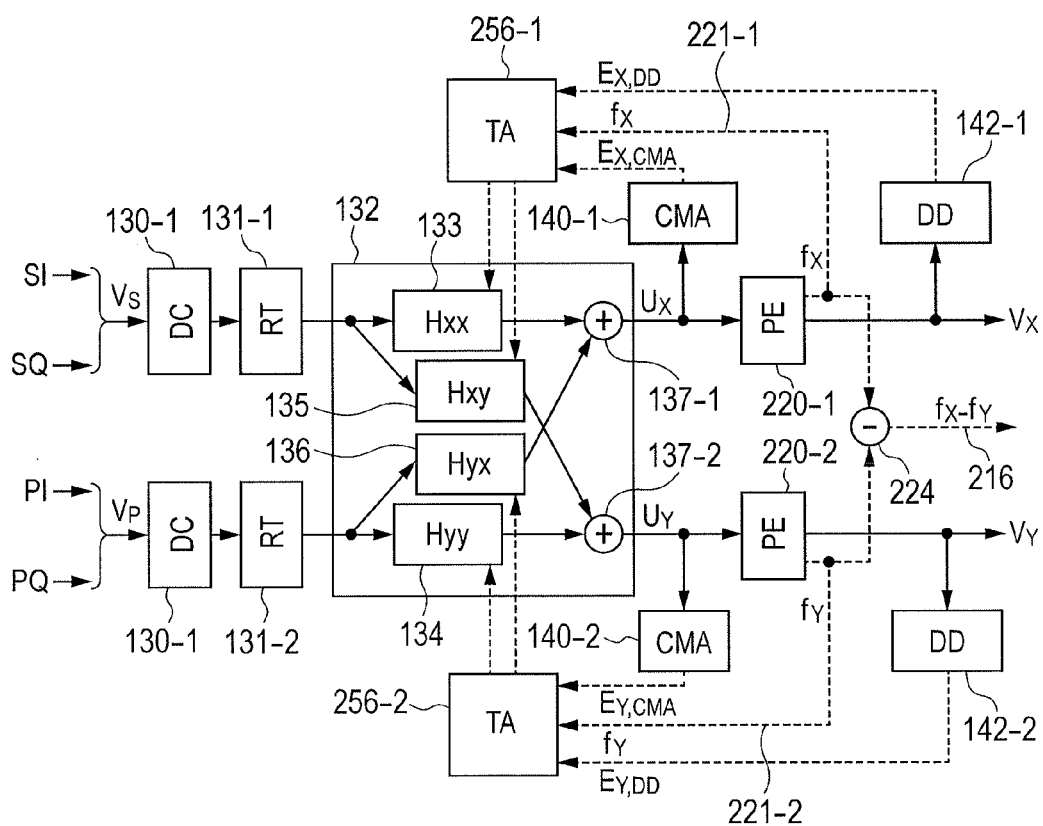
FIG. 14 is a configuration diagram showing a digital signal processing circuit 214 according to a fifth embodiment of the invention.

FIG. 14 is a configuration diagram showing a digital signal processing circuit 214 according to a fifth embodiment of the invention. The example provides fast and highly reliable polarization convergence for the butterfly FIR filter 132 used for polarization splitting. The frequency and phase correction circuits 220-1 and 220-2 output the offset frequency estimation signals 221-1 and 221-2. These signals are respectively input to polarization-check tap optimization circuits 256-1 and 256-2. The polarization-check tap optimization circuit 256-1 discriminates the X-polarization component from the received signal and controls the tap coefficient for the butterfly FIR filter 132 so that the X-polarization component is maximized. The butterfly FIR filter 132 can therefore fast converge on a targeted polarization state. Similarly to the first embodiment, the following description assumes that the transmission side configures an optical frequency for the X-polarization component so as to be higher than the Y-polarization component by a specified value (2Δf). The polarization-check tap optimization circuit 256-1 varies the tap in a direction that increases values of the offset frequency estimation signal 221-1. Consequently, the butterfly FIR filter 132 can fast change to the state of extracting the targeted X-polarization component. On the other hand, the polarization-check tap optimization circuit 256-2 varies the tap in a direction that decreases values of the offset frequency estimation signal 221-2. Consequently, the butterfly FIR filter 132 can fast change to the state of extracting the targeted Y-polarization component. These operations prevent the output signals UX and UY from matching, solve the above-mentioned singularity problem, and eliminate otherwise required reconvergence. The polarization convergence can be fast and highly reliable.

Figure 15:
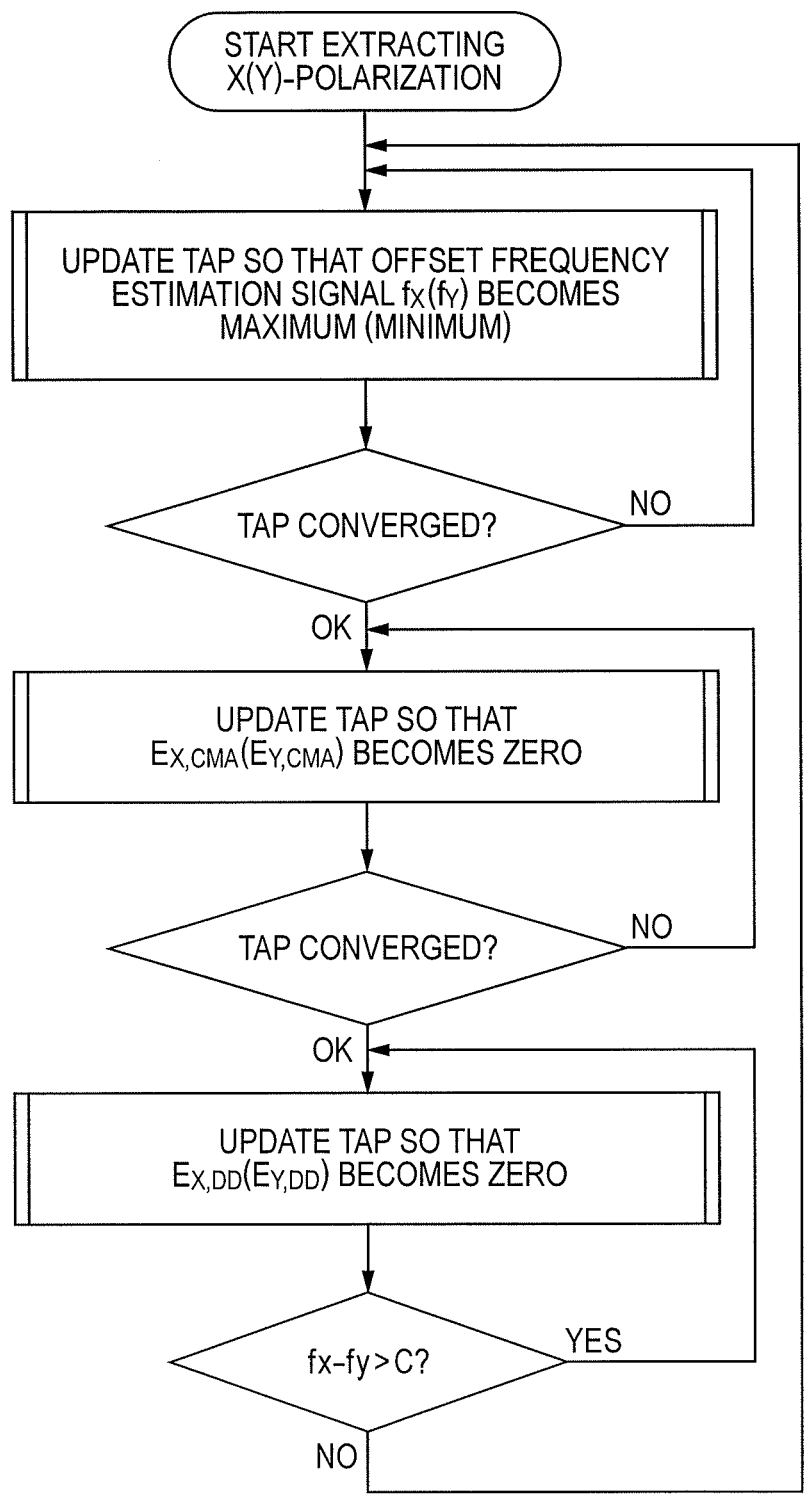
FIG. 15 is a flowchart showing operations of a polarization-check tap optimization circuit 256 according to the fifth embodiment of the invention.

The above-mentioned control may be always used with control signals for the CMA and the decision-directed algorithm. Alternatively, the control may be used in a stepwise fashion according to a flowchart as shown in FIG. 15. FIG. 15 is the flowchart showing operations of the polarization-check tap optimization circuit 256. To extract the X-polarization component, for example, the tap of the butterfly FIR filter 132 is updated so that the offset frequency estimation signal 221 (fx) is maximized. After the tap converges and the polarization splitting is completed, the CMA and the decision-directed algorithm may be selectively enabled to equalize a high-precision multilevel signal in accordance with the related art. Similarly to FIG. 7, the embodiment also provides the inter-polarization difference frequency output terminal 225 that outputs an inter-polarization difference frequency. If the inter-polarization difference frequency fx–fy becomes smaller than a predetermined value (c), it is possible to determine that an error occurs during the control operation and the polarization splitting state becomes abnormal. In such a case, the butterfly FIR filter is controlled as soon as possible so that the offset frequency estimation signal 221 (fx) is maximized. The targeted polarization state can be restored immediately.

The butterfly filter used for the embodiment is not limited to the above-mentioned control method but allows diverse methods. An example control method may calculate a residual error between the difference frequency and its target value 2Δf and control the tap coefficient in a direction that eliminates the residual error. Actually, the configuration of the polarization splitting circuit may include not only the butterfly filter as described in the above-mentioned embodiments, but also independent digital arithmetic circuits. In any of these cases, the effect of the embodiment is available through the optimization control using an offset frequency or a frequency difference for polarization components extracted from within the receiver.

Figure 16:
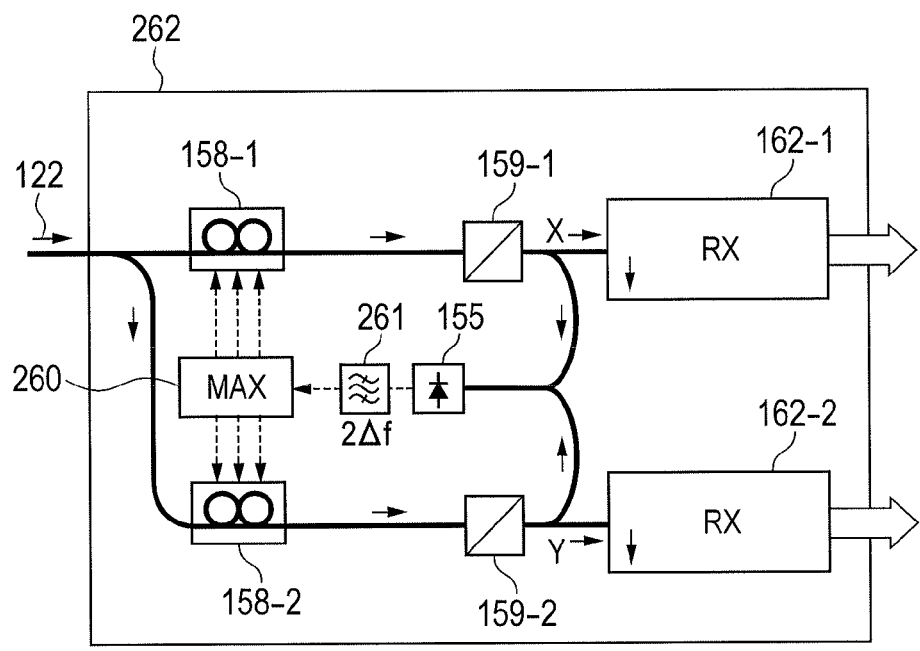
FIG. 16 is a configuration diagram showing a polarization-multiplexed transmission system according to a sixth embodiment of the invention.

FIG. 16 is a configuration diagram showing a polarization splitting optical receiver 262 according to a sixth embodiment of the invention. The example configures the above-mentioned polarization splitting circuit using an automatic polarization controller and an analyzer as a polarization-dependent device (polarization-dependent transparent device). The example uses independent automatic polarization controllers for optimization control in order to achieve a high degree of separation for the X-polarization and the Y-polarization. The polarization-multiplexed received optical signal 122 is split into two. The two signals pass through automatic polarization controllers 158-1 and 158-2 and are input to polarization splitters 159-1 and 159-2. The polarization splitter 159-1 is connected to an optical receiver 162-1 for receiving the X-polarization component. The polarization splitter 159-2 is connected to an optical receiver 162-2 for receiving the Y-polarization component. The polarization splitters 159-1 and 159-2 partially branch the received optical signals. The branched signals are combined and are guided to the low-speed optical detector 155. Received light beams for the X-polarization and the Y-polarization are configured to interfere with each other in the low-speed optical detector 155. As a result, the interference generates a beat component (frequency 2Δf in the above-mentioned example) corresponding to the specified frequency difference between the X-polarization and the Y-polarization if the X-polarization component is correctly input to the receiver 162-1 and the Y-polarization component is correctly input to the receiver 162-2. A difference frequency component extraction filter 261 according to the embodiment extracts a frequency difference component and inputs it to a difference frequency component maximization circuit 260. The difference frequency component maximization circuit 260 controls the automatic polarization controllers 158-1 and 158-2 so as to maximize the detected frequency difference component (2Δf in FIG. 16). In this manner, the polarization splitting state becomes available promptly.

FIG. 16 shows only an example configuration of the polarization splitting system and the detection system. If needed, changes may be made to the arrangement positions of polarization control circuits and the method of detecting a difference frequency from polarization components, for example. For example, an optical frequency discriminator may be configured to use an optical filter having steep optical frequency dependency in equalization characteristics. The discriminator may directly measure center frequencies for optical signals input to the receivers 162-1 and 162-2. The automatic polarization controllers 158-1 and 158-2 may be controlled so as to increase a difference between the center frequencies.

Figure 17:
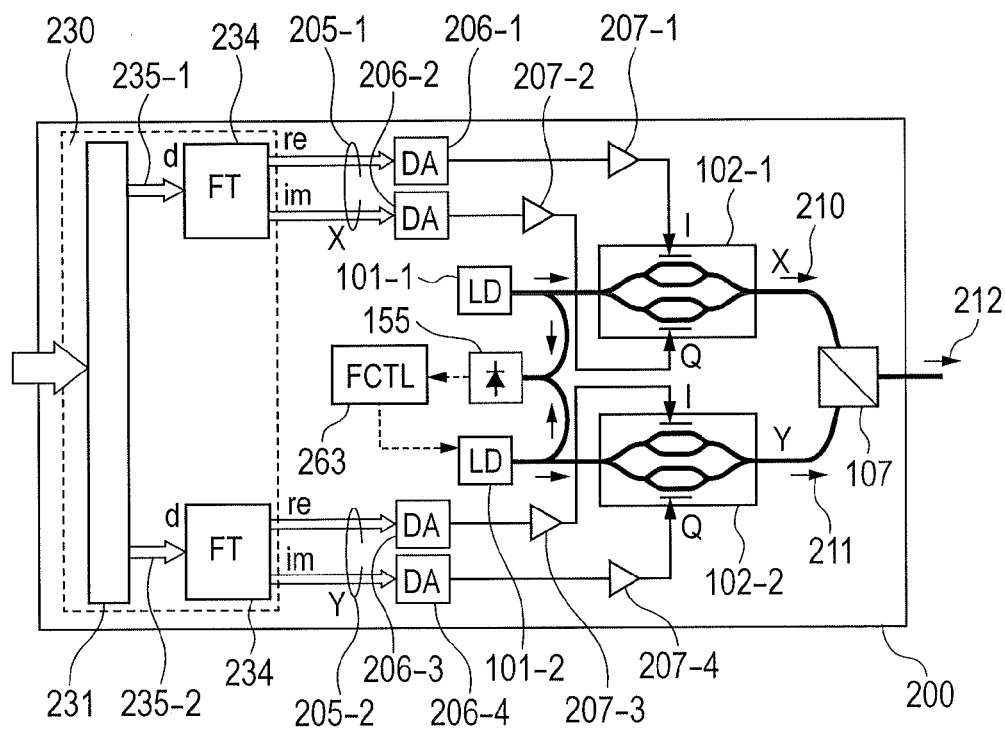
FIG. 17 is a configuration diagram showing a polarization-multiplexed optical transmitter according to a seventh embodiment of the invention.

FIG. 17 is a configuration diagram showing a polarization-multiplexed optical transmitter according to a seventh embodiment of the invention. The example uses light sources 101-1 and 101-2 indicating a specified amount as a difference between their oscillation frequencies. Optical modulators 102-1 and 102-2 apply multilevel modulation to light beams and multiplex them using the mutually orthogonal polarizations. In this manner, the effect of the present invention is available. The semiconductor laser used as a light source is prone to a change of several gigahertz or more in the oscillation frequency due to the ambient environment including temperature and pressure and the aging degradation. The example stabilizes frequencies so that a frequency difference between the two light sources always matches a specified value. Specifically, light beams output from both light sources are partially split and interfere with each other in the low-speed optical detector 155 so that their beat component can be detected. It is possible to improve the beat component detection efficiency if the polarization states of both light beams are converted so as to be parallel to each other. The beat component frequency equals a frequency difference between both light beams. The beat component frequency is input to a frequency stabilization circuit 263. The oscillation frequency of the laser source 101-2 is fine-tuned so that the difference frequency is always constant. In this manner, the targeted effect is available.

It may be preferable to branch light as transmission light output from a multi-wavelength light source that outputs multiple light beams as different as specified frequencies.

The present invention supplies a specified frequency difference to the mutually orthogonal polarization components transmitted from the polarization-multiplexed optical transmitter and thereby provides the effect of improving the accuracy, speed, and reliability of the polarization splitting on the reception side. Increasing a frequency difference requires extra optical and electric bands for optical signal transmission and received signal processing. Limiting a specified frequency difference to about 20% of the bandwidth provides an effect of minimizing a band increase and suppressing transmission signals from degrading. In principle, the transmission characteristics degradation can be eliminated because a frequency difference between light sources is used to separate polarization components. The invention is much more advantageous than the related art that supplies polarization components with intensity modulation and phase modulation of small signals.

To supply a specified frequency difference between polarization components, the two optical modulators frequency-shift center frequencies of input light for amounts different from each other. Therefore, the transmitter configuration can be simplified. There is available another effect of using an electric domain to accurately specify a frequency difference digitally or as an electric oscillator frequency. If the modulators are provided as optical field modulators, the modulators directly generate an optical signal electric field by slightly shifting the center frequency. That is, the modulators generate a two-dimensional rotational multilevel optical field equivalent to an optical multilevel modulation signal supplied with mutually different center frequency shifts. The optical multilevel modulation portion and the frequency shift portion are provided in common use. Therefore, the transmitter configuration can be simplified.

Digital signal processing easily generates such electric field signals by providing a high-speed DA converter for each modulation electrode of the optical modulator. There is an advantage of little addition to hardware compared to ordinary multilevel transmitters. It may be preferable to perform analog complex multiplication or addition on the multilevel information signal and the sine wave signal output from the analog oscillator. Also in this case, addition of a small number of parts can achieve the invention.

The polarization-multiplexed transmitter according to the invention can be also easily provided as follows. Output light from one transmission light source is split into two that are each input to optical modulators. An optical frequency shift function is provided for, before, or after the optical modulator. Center frequencies of the two output light beams are shifted so as to cause a difference of the specified amount.

The reception side receives a polarization-multiplexed optical multilevel signal according to the invention and detects the specified frequency difference component from the received polarization components. The reception side identifies or separates the original orthogonal polarization component that is multiplexed based on the detected information. It is possible to avoid the singularity problem due to polarization state convergence and greatly shorten the startup time for an optical transmission system.

The invention can be effectively used to determine occurrence of the singularity problem based on whether any of the following factors is greater than or equal to a specified value: a specified frequency difference extracted from two polarization components; the intensity of a specified frequency component in the difference frequency signal between two polarization components; and a difference between the center optical frequency of an optical signal received at one receiver and that of an optical signal received at the other receiver. If these conditions are not satisfied, it is possible to promptly determine that the polarization splitting circuit on the reception side malfunctions and extracts the same polarization component. The receiver can fast reset the polarization splitting circuit inside and start reconvergence in a short time without awaiting frame correctness information output from a framer IC outside the receiver.

Further, the polarization splitting circuit may be automatically controlled so as to increase a difference frequency between the two polarization components, provide high intensity for a specified frequency component in the difference frequency component, or increase an optical frequency difference between the two polarization components. The polarization splitting can thereby operate so as to separate two different polarization components from the beginning. It is possible to avoid the singularity problem in principle and more promptly extract the targeted polarization component. For example, the transmission side may set a modulation frequency for the X-polarization component to be higher than that for the Y-polarization component. The reception side may assume a direction of positive frequencies to be normal convergence. The receiver can prevent the polarization components from being replaced.

Any frequency difference can be specified on a wavelength or channel basis by providing an input terminal or a function that specifies a specified frequency difference between the orthogonal polarization components from the outside. The transmission side may be capable of detecting a difference frequency component. It is possible to suppress polarization crosstalk in channel identification or between channels. The reception side may detect difference frequency information and output it to the outside. It is possible to monitor operation situations of the polarization splitting and configure a highly reliable network.

An offset frequency estimation circuit is provided immediately after the polarization splitting circuit if a polarization diversity coherent optical receiver is used to receive signals. Accordingly, the difference frequency component can be extracted while the hardware scale is hardly enhanced.

The present invention provides a technology of facilitating optical polarization-multiplexed transmission and optical polarization splitting in the field of optical communication. In particular, the invention improves the reliability and shortens the startup time of the polarization-multiplexed optical transmission system using the digital coherent receiver. The invention is widely applicable to high-speed optical fiber communication at a rate or 10 to 100G bits per second or more, for example.

What is claimed is:

1. A polarization-multiplexed optical transmission system comprising:
  a polarization-multiplexed optical transmitter that:
   i) includes two optical modulators and a polarization beam combiner,
   ii) modulates input light input to the two optical modulators using mutually different multilevel information signals being one of one-dimensional and two-dimensional to generate an optical multilevel signal, and iii) allows the polarization beam combiner to multiplex the optical multilevel signal into mutually orthogonal polarizations for transmission, wherein the polarization-multiplexed optical transmitter supplies a specified frequency difference to a center frequency of an optical multilevel signal for the mutually orthogonal polarization components; and a polarization-multiplexed optical receiver including: an adaptive polarization splitting circuit for adaptively separating two orthogonal polarization components from a polarization-multiplexed signal; and two sets of demodulation parts for demodulating two separated polarization components, wherein the polarization-multiplexed optical receiver detects a frequency difference component in two received polarization components and identifies or separates a multiplexed original orthogonal polarization component based on a detected frequency component, center frequencies of each of the mutually orthogonal polarization components: i) are first matched, and ii) are subsequently shifted by different amounts with respect to the matching center frequencies, and the specified frequency difference is approximately 20% or less of an entire bandwidth occupied by a transmitted optical signal.

2. The polarization-multiplexed optical transmission system according to claim 1, wherein the polarization-multiplexed optical receiver resets an operation of the adaptive polarization splitting circuit in any of cases, in which intensity for a frequency difference component is detected from two polarization components and is smaller than or equal to a predetermined value; a frequency difference between two polarization components is smaller than or equal to a predetermined value; or a difference between the center optical frequency of an optical signal demodulated at one of the demodulation parts and that of an optical signal demodulated at the other thereof is smaller than a predetermined value.

3. The polarization-multiplexed optical transmission system according to claim 1, wherein the polarization-multiplexed optical receiver extracts one of a frequency difference component detected from the two polarization components and frequency information corresponding to a center frequency of an optical signal received by each of the two sets of demodulation parts; and wherein the polarization-multiplexed optical receiver adaptively adjusts the adaptive polarization splitting circuit in consideration of any of: one of maximizing and minimizing a difference between center frequencies received by each of the two sets of demodulation parts; maximizing intensity of a frequency difference component; and making one of pieces of frequency information corresponding to the center frequencies received by each of the two sets of demodulation parts greater than the other.

4. The polarization-multiplexed optical transmission system according to claim 1, wherein the polarization-multiplexed optical transmitter has an input terminal for externally specifying the specified frequency difference between two orthogonal polarization components and has a function of specifying the specified frequency difference; and wherein the polarization-multiplexed optical receiver has an input terminal for externally specifying a specified frequency difference to be detected and has a function of specifying the specified frequency difference.

5. The polarization-multiplexed optical transmission system according to claim 1, wherein the polarization-multiplexed optical receiver has a function of outward outputting any of: difference information between center frequencies of signals received at the two sets of demodulation parts; frequency information corresponding to each of center frequencies of signals received at the two sets of demodulation parts; and intensity of a component of the specified frequency difference.

6. The polarization-multiplexed optical transmission system according to claim 1, wherein the polarization-multiplexed optical receiver is equivalent to a digital coherent polarization-multiplexed optical receiver that receives a signal based on polarization diversity coherent detection and provides the adaptive polarization splitting circuit based on digital signal processing.

7. The polarization-multiplexed optical transmission system according to claim 1, wherein the adaptive polarization splitting circuit includes an automatic polarization controller and a polarization-dependent transparent device.

8. A polarization-multiplexed optical transmitter comprising:

two optical modulators and a polarization beam combiner, wherein the polarization-multiplexed optical transmitter modulates input light input to the two optical modulators using mutually different multilevel information signals being one of one-dimensional and two-dimensional to generate an optical multilevel signal;

the polarization-multiplexed optical transmitter allows the polarization beam combiner to multiplex the optical multilevel signal into mutually orthogonal polarizations for transmission, the polarization-multiplexed optical transmitter supplies a specified frequency difference to a center frequency of an optical multilevel signal for the mutually orthogonal polarizations, center frequencies of each of the mutually orthogonal polarizations: i) are first matched, and ii) are subsequently shifted by different amounts with respect to the matching center frequencies, and the specified frequency difference is approximately 20% or less of an entire bandwidth occupied by a transmitted optical signal.

9. The polarization-multiplexed optical transmitter according to claim 8, wherein the polarization-multiplexed optical transmitter includes one transmission light source, splits output light from the light source into two each to be input to optical modulators, and provides an optical frequency shift function portion for, before, or after the optical modulator; and wherein the optical frequency shift function portion shifts center frequencies of the two output light beams so as to differ from each other by an amount equivalent to the specified frequency difference.

10. The polarization-multiplexed optical transmitter according to claim 8, wherein input light to the two optical modulators is used as one of: output light from two light sources having different oscillation frequencies differing from each other by a specified frequency; and a branched version of output light from a multi-wavelength light source that outputs a plurality of light beams differing from each other by a specified frequency.

11. The polarization-multiplexed optical transmitter according to claim 8,
wherein the optical modulator is equivalent to an optical field modulator that outputs any two-dimensional optical field corresponding to a two-dimensional voltage signal applied to a plurality of modulation electrodes; and
wherein the two optical modulators generate a two-dimensional rotational optical multilevel modulation signal by applying center frequency shifts, differing from each other by the specified frequency, to two-dimensional multilevel modulation signals.

12. The polarization-multiplexed optical transmitter according to claim 11,
wherein the polarization-multiplexed optical transmitter includes a digital-to-analog converter connected to each modulation electrode of the optical modulator, generates a two-dimensional rotational multilevel modulation voltage signal corresponding to the two-dimensional rotational optical multilevel modulation signal, and applies the voltage to a modulation electrode of the optical modulator.

13. The polarization-multiplexed optical transmitter according to claim 11, further comprising:
a low-frequency analog oscillator; and
one of analog multiplier and an analog adder connected to each modulation electrode of the optical modulator, wherein
the polarization-multiplexed optical transmitter generates a two-dimensional rotational optical multilevel modulation by performing one of complex multiplication and addition on the multilevel information signal and a sine wave signal output from the low-frequency analog oscillator.

14. A polarization-multiplexed optical receiver in a polarization-multiplexed optical transmission system that also includes a polarization-multiplexed optical transmitter, the receiver comprising:
an adaptive polarization splitting circuit for adaptively separating two orthogonal polarization components from a polarization-multiplexed signal; and
two sets of demodulation parts for demodulating two separated polarization components, wherein
the polarization-multiplexed optical receiver detects a frequency difference component in two received polarization components and identifies or separates a multiplexed original orthogonal polarization component based on a detected frequency component, and
the polarization-multiplexed optical transmitter:
i) includes two optical modulators and a polarization beam combiner,
ii) modulates input light input to the two optical modulators using mutually different multilevel information signals being one of one-dimensional and two-dimensional to generate an optical multilevel signal,
iii) allows the polarization beam combiner to multiplex the optical multilevel signal into mutually orthogonal polarizations for transmission,
iv) supplies a specified frequency difference to a center frequency of an optical multilevel signal for the mutually orthogonal polarizations, center frequencies of each of the mutually orthogonal polarization components: i) are first matched, and ii) are subsequently shifted by different amounts with respect to the matching center frequencies, and
the specified frequency difference is approximately 20% or less of an entire bandwidth occupied by a transmitted optical signal.

15. The polarization-multiplexed optical receiver according to claim 14,
wherein the polarization-multiplexed optical receiver resets an operation of the adaptive polarization splitting circuit in any of cases, in which intensity for a frequency difference component is detected from two polarization components and is smaller than or equal to a predetermined value; a frequency difference between two polarization components is smaller than or equal to a predetermined value; and a difference between the center optical frequency of an optical signal received at one of the demodulation parts and that of an optical signal demodulated at the other thereof is smaller than a predetermined value.

16. The polarization-multiplexed optical receiver according to claim 14,
wherein the polarization-multiplexed optical receiver extracts one of a frequency difference component detected from the two polarization components and frequency information corresponding to a center frequency of an optical signal demodulated by each of the two sets of demodulation parts; and
wherein the polarization-multiplexed optical receiver adaptively adjusts the adaptive polarization splitting circuit in consideration of any of: one of maximizing and minimizing a difference between center frequencies demodulated by each of the two sets of demodulation parts; maximizing intensity of a frequency difference component; and making one of pieces of frequency information corresponding to the center frequencies demodulated by each of the two sets of demodulation parts greater than the other.

17. The polarization-multiplexed optical receiver according to claim 14, comprising:
an input terminal for externally specifying a specified frequency difference to be detected; and
a function of specifying the specified frequency difference.

18. The polarization-multiplexed optical receiver according to claim 14, comprising:
a function of outward outputting any of: difference information between center frequencies of signals received at the two sets of demodulation parts; frequency information corresponding to each of center frequencies of signals received at the two sets of demodulation parts; and intensity of a component of the specified frequency difference.

19. The polarization-multiplexed optical receiver according to claim 14,
wherein the polarization-multiplexed optical receiver is equivalent to a digital coherent polarization-multiplexed optical receiver that receives a signal based on polarization diversity coherent and provides the adaptive polarization splitting circuit based on digital signal processing.

* * * * *